US011837979B2

(12) United States Patent
Orii et al.

(10) Patent No.: US 11,837,979 B2
(45) Date of Patent: Dec. 5, 2023

(54) ELECTRIC MOTOR CONTROL DEVICE AND ELECTRIC POWER STEERING APPARATUS USING THE SAME

(71) Applicant: Mitsubishi Electric Corporation, Tokyo (JP)

(72) Inventors: Masahiko Orii, Tokyo (JP); Isao Kezobo, Tokyo (JP); Tatsuya Mori, Tokyo (JP); Genki Fujii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 179 days.

(21) Appl. No.: 17/598,414

(22) PCT Filed: Jun. 27, 2019

(86) PCT No.: PCT/JP2019/025626
§ 371 (c)(1),
(2) Date: Sep. 27, 2021

(87) PCT Pub. No.: WO2020/217548
PCT Pub. Date: Oct. 29, 2020

(65) Prior Publication Data
US 2022/0181998 A1    Jun. 9, 2022

(30) Foreign Application Priority Data
Apr. 25, 2019  (JP) ................................. 2019-083633

(51) Int. Cl.
*H02P 21/00*  (2016.01)
*H02P 21/05*  (2006.01)
(Continued)

(52) U.S. Cl.
CPC ............ *H02P 21/05* (2013.01); *B62D 5/0463* (2013.01); *H02P 21/06* (2013.01); *H02P 27/06* (2013.01)

(58) Field of Classification Search
CPC .......... H02P 21/05; H02P 27/06; H02P 21/06; B62D 5/0463
(Continued)

(56) References Cited

U.S. PATENT DOCUMENTS

2011/0175556 A1    7/2011  Tobari et al.
2011/0241586 A1*  10/2011  Tobari ................. H02P 21/06
                                       318/400.23
(Continued)

FOREIGN PATENT DOCUMENTS

JP    2007-267466 A    10/2007
JP    2011-019336 A     1/2011
(Continued)

OTHER PUBLICATIONS

International Search Report for PCT/JP2019/025626 dated Sep. 3, 2019.
(Continued)

*Primary Examiner* — Erick D Glass
(74) *Attorney, Agent, or Firm* — Sughrue Mion, PLLC; Richard C. Turner

(57) ABSTRACT

An electric motor control device, capable of suppressing a torque ripple even when electrical characteristics on a motor have errors or variations, comprises: a fundamental electric-current instruction generator for outputting d-axis and q-axis fundamental electric-current instructions for outputting fundamental torque from the motor having saliency; a position dependency component generator for outputting a position dependency component(s) of the motor according to its rotational position; an electric current correction instruction calculator for calculating d-axis and q-axis current correction instructions from the d-axis and q-axis fundamental electric-current instructions, and the position dependency component(s); an electric current correction instruction
(Continued)

superposition unit for generating d-axis and q-axis current instructions by performing superposition of the d-axis and q-axis current correction instructions on the d-axis and q-axis fundamental electric-current instructions; and an electric current controller for controlling a current to flow through the motor by an inverter, based on the d-axis and q-axis current instructions.

16 Claims, 14 Drawing Sheets

(51) Int. Cl.
    *B62D 5/04*     (2006.01)
    *H02P 21/06*     (2016.01)
    *H02P 27/06*     (2006.01)

(58) Field of Classification Search
    USPC ................................................ 318/400.02
    See application file for complete search history.

(56) References Cited

U.S. PATENT DOCUMENTS

| | | | |
|---|---|---|---|
| 2013/0099707 A1* | 4/2013 | Okubo | H02P 6/10 |
| | | | 318/400.23 |
| 2018/0309399 A1* | 10/2018 | Kitagawa | H02P 21/22 |
| 2019/0047613 A1 | 2/2019 | Kano et al. | |
| 2021/0391814 A1* | 12/2021 | Tachibana | H02P 6/183 |
| 2022/0209702 A1* | 6/2022 | Matsuo | H02P 21/22 |
| 2022/0231630 A1* | 7/2022 | Ohata | H02P 29/50 |

FOREIGN PATENT DOCUMENTS

| | | |
|---|---|---|
| JP | 2015-035885 A | 2/2015 |
| JP | 2017-70066 A | 4/2017 |

OTHER PUBLICATIONS

Written Opinion for PCT/JP2019/025626 dated Sep. 3, 2019.
Extended European Search Report dated May 16, 2022 in Application No. 19925603.3.

* cited by examiner

ELECTRIC MOTOR CONTROL DEVICE AND ELECTRIC POWER STEERING APPARATUS USING THE SAME

CROSS REFERENCE TO RELATED APPLICATIONS

This application is a National Stage of International Application No. PCT/JP2019/025626 filed Jun. 27, 2019, claiming priority based on Japanese Patent Application No. 2019-083633 filed Apr. 25, 2019.

TECHNICAL FIELD

The disclosure of the present application relates to an electric motor control device, and to an electric power steering apparatus using the electric motor control device.

BACKGROUND ART

In electric motors, PM motors (interior permanent magnet motors) residing in features as their compact construction and high efficiency have been utilized widely in recent years for industrial devices and apparatus. However, a PM motor has a spatial harmonic(s) in its rotating magnetic field inherent in the structure, whereby a harmonic component(s) is produced in its induced voltage(s) because of the spatial harmonic(s), so that a torque ripple is caused. Because the torque ripple may be originated as a cause to introduce problems such as vibration or noise, and as mechanical resonance, a reduction technology is required therefor. As the reduction technology, a method is disclosed in which an electric current instruction value capable of suppressing a torque ripple is produced, and the torque ripple is suppressed in such a manner that superposition of the electric current instruction value is performed on a basic electric current instruction(s) (for example, refer to Patent Document 1).

In Patent Document 1, a spatial harmonic of a rotating magnetic field produced in an electric motor is held as table data related to a rotational position; an electric current instruction is made so that a torque ripple caused by the spatial harmonic becomes "0"; and torque ripple suppression is carried out by performing superposition of the electric current instruction on a basic electric current instruction.

RELATED ART DOCUMENT

[Patent Document]
[Patent Document 1] Japanese Patent Laid-Open No. 2007-267466

SUMMARY OF THE INVENTION

Problems to be Solved by the Invention

As described above, in a torque-ripple suppression control device described in Patent Document 1, torque ripple suppression is made possible in such a case that electrical characteristics on an electric motor can be preliminarily acquired in higher accuracy.

However, it is natural to consider that, in electrical characteristics on an electric motor having been preliminarily acquired, a design value or measurement value has an error with respect to its true value, and, in addition, the electrical characteristics vary depending on an operating state of the electric motor or its manufacturing variations. For this reason, there exists a problem in which an effect of torque ripple suppression is not exerted in such a case that an acquisition value of an electrical characteristic on an electric motor is alienated from a true value thereon. Under actual circumstances, Patent Document 1 does not take a configuration based on errors of median values of electrical parameters such as armature interlinkage magnetic-flux of an electric motor, inductance thereof and the like, and so the control is performed by using only a median value of an electrical parameter, by excluding a pulsation term.

The present disclosure of the application concerned has been directed at solving those problems as described above, and an object of the disclosure is to provide an electric motor control device which makes possible to suitably suppress a torque ripple even in a case in which acquisition values of electrical characteristics on an electric motor have errors.

Means for Solving the Problems

An electric motor control device disclosed in the disclosure of the application concerned is an electric motor control device which comprises: a fundamental electric-current instruction generator for outputting a d-axis fundamental electric-current instruction and a q-axis fundamental electric-current instruction for thereby outputting fundamental torque from an electric motor having saliency; a position dependency component generator for outputting a position dependency component of the electric motor in accordance with a rotational position of the electric motor; an electric current correction instruction calculator for calculating a d-axis current correction instruction and a q-axis current correction instruction from the d-axis fundamental electric-current instruction and the q-axis fundamental electric-current instruction, and from the position dependency component; an electric current correction instruction superposition unit for generating a d-axis electric current instruction by performing superposition of the d-axis current correction instruction on the d-axis fundamental electric-current instruction, and for generating a q-axis electric current instruction by performing superposition of the q-axis current correction instruction on the q-axis fundamental electric-current instruction; and an electric current controller for controlling an electric current to flow through the electric motor, based on the d-axis electric current instruction and the q-axis electric current instruction, wherein the electric current correction instruction calculator calculates a ratio being determined in advance to become the magnitude of the d-axis current correction instruction and that of the q-axis current correction instruction, and the ratio is preliminarily specified or specified in accordance with a state of the electric motor.

Effects of the Invention

According to the electric motor control device disclosed in the disclosure of the application concerned, it is possible to calculate a ratio determined by the electric current correction instruction calculator so as to become the magnitude of the d-axis current correction instruction and that of the q-axis current correction instruction. By specifying a ratio being determined so as to become the magnitude of the d-axis current correction instruction and that of the q-axis current correction instruction, and by reducing the sensitivity of torque ripple with respect to errors of acquisition values of electrical characteristics on an electric motor, it becomes possible to achieve suppression of the torque ripple even in a case in which there exist errors in electrical characteristics on the electric motor.

EMBODIMENTS FOR CARRYING OUT THE INVENTION

Figure 1:
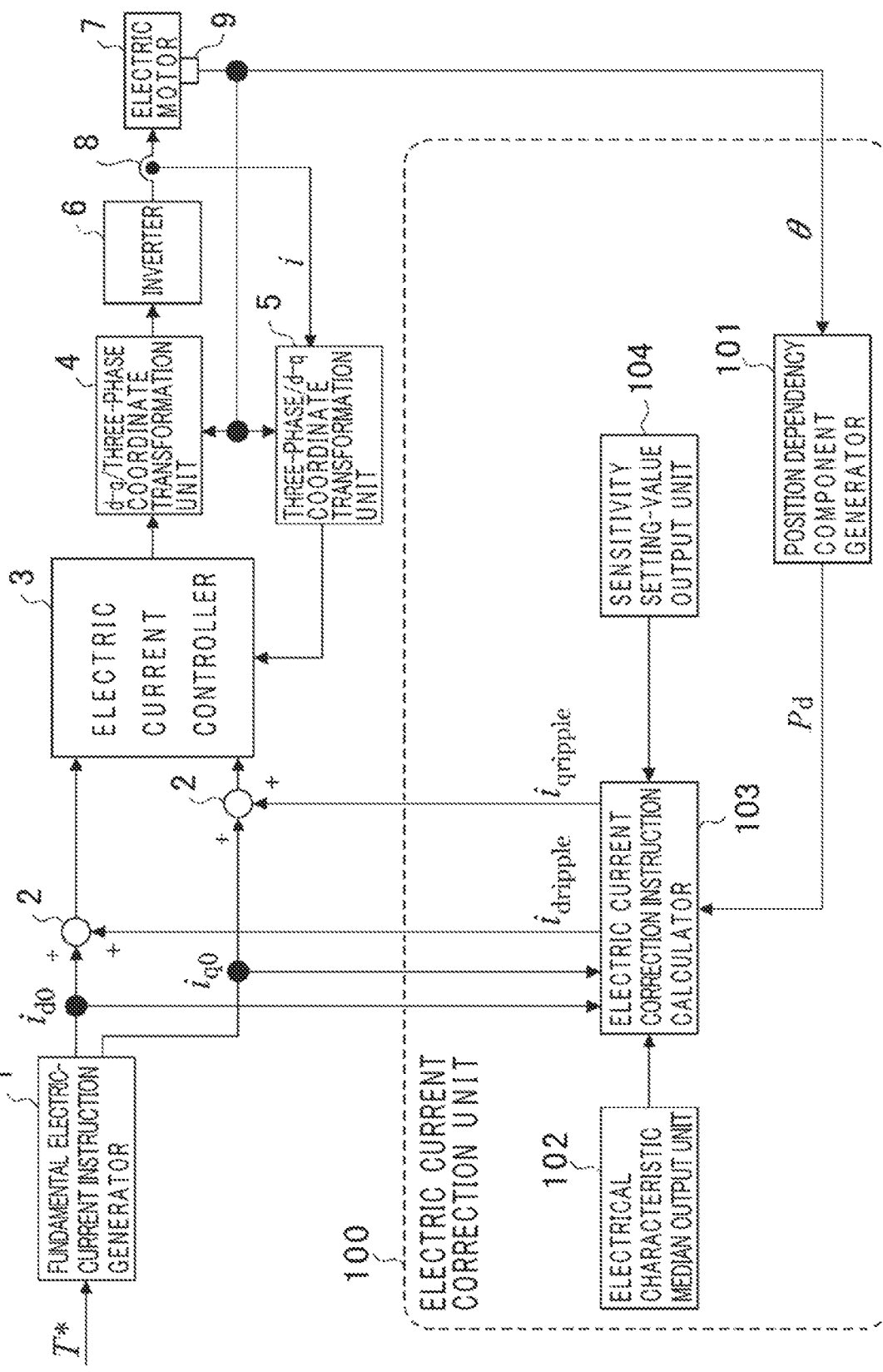
FIG. 1 is a block diagram illustrating a schematic configuration of an electric motor control device according to Embodiment 1.

Hereinafter, the explanation will be made referring to the figures for embodiments of electric motor control devices; meanwhile, in each of the figures, the explanation will be made in such a way that the same or corresponding items, portions or parts designate the same reference numerals and symbols.

Embodiment 1

FIG. 1 is a block diagram of an electric motor control device according to Embodiment 1. In FIG. 1, the electric motor control device includes a fundamental electric-current instruction generator 1, electric current correction instruction superposition units 2, an electric current controller 3, a d-q/three-phase coordinate transformation unit 4, a three-phase/d-q coordinate transformation unit 5, an inverter 6 of a vector control scheme, and an electric current correction unit 100. In the interior of the electric current correction unit 100, included are a position dependency component generator 101 on an electric motor, an electrical characteristic median output unit 102 on the electric motor, an electric current correction instruction calculator 103 and a sensitivity setting-value output unit 104. Into the electric motor control device, inputted are a detection signal from an electric current detector 8 of an electric motor 7 having saliency and that of a rotational position detector 9 thereof.

Next, the explanation will be made for the functions and operations of those constituent elements each.

The fundamental electric-current instruction generator 1 calculates a d-axis fundamental electric-current instruction id0 and a q-axis fundamental electric-current instruction iq0 based on a torque instruction value T* from an upper-level control system, and output them. As for the calculation of the d-axis fundamental electric-current instruction and the q-axis fundamental electric-current instruction, they may also be calculated for conformance to a maximum torque control. In addition, they may also be calculated based on a publicly known fundamental electric-current instruction(s) in accordance with an operating condition(s).

The electric current correction instruction superposition units 2 each add outputs from the fundamental electric-current instruction generator 1 together with electric current correction instructions being respective outputs of the electric current correction instruction calculator 103.

The electric current controller 3 calculates d-axis and q-axis voltage instruction values, and outputs them by means of a control scheme in such a manner that an actual d-axis current and an actual q-axis current follow up outputs from the electric current correction instruction superposition units 2, respectively. As for the control scheme, a PI control may also be suitably used. In addition, another publicly known control scheme may also be suitably used for.

The d-q/three-phase coordinate transformation unit 4 converts d-axis and q-axis voltage instructions outputted by the electric current controller 3 into voltage instructions on three-phase coordinates by using a rotational position of the electric motor detected by the rotational position detector 9, and inputs the converted voltage instructions into the inverter 6. The inverter 6 applies three-phase voltages to the electric motor 7.

The three-phase/d-q coordinate transformation unit 5 converts actual three-phase currents detected by the electric current detector 8 into d-axis and q-axis currents by using a rotational position of the electric motor detected by the rotational position detector 9.

The position dependency component generator 101 outputs a position dependency component Pd being a component of electrical characteristic which depends on a position of the electric motor, in accordance with a rotational position of the electric motor having been detected by the rotational position detector 9.

The electric motor's electrical characteristic median output unit 102 outputs into the electric current correction instruction calculator 103 a median value(s) of electrical characteristic(s) on the electric motor which is a target of the control. In addition, the sensitivity setting-value output unit 104 outputs into the electric current correction instruction calculator 103 a value being preliminarily specified by design personnel, or a value being set in accordance with an operational state or conditions, as the sensitivity of torque ripple with respect to an error(s) of electrical characteristic (s) on the electric motor. The explanation will be made in detail together with the electric current correction instruction calculator 103.

The electric current correction instruction calculator 103 calculates d-axis and q-axis current correction instructions for suppressing a torque ripple, from a d-axis fundamental electric-current instruction's value, a q-axis fundamental electric-current instruction's value, a median value(s) of electrical characteristic(s) on the electric motor, a position dependency component on the electric motor, and a sensitivity setting-value; and the electric current correction instruction calculator outputs the d-axis and q-axis current correction instructions.

Hereinafter, the explanation will be made for the principle of the electric current correction instruction calculator 103, and for effects of d-axis and q-axis current correction instructions being outputted from the electric current correction instruction calculator 103. Torque of an electric motor having saliency can be given by Expression (1) as follows.

[Expression Figure—1]

$$T = P_m((L_d - L_q)i_d i_q + i_q \Phi_d - i_d \Phi_q) \quad (1)$$

Here, designated are: T, torque; Pm, the number of pole pairs of an electric motor; Ld, d-axis inductance thereof; Lq, q-axis inductance thereof; id, a d-axis electric current thereof; iq, a q-axis electric current thereof; Φd, d-axis magnet's magnetic flux thereof; and Φq, q-axis magnet's magnetic flux thereof.

In Expression (1), because of inductances Ld and Lq whose difference therebetween contributes to torque, the definition is made here so that inductance L=Ld−Lq, and Expression (1) described above is converted into Expression (2).

[Expression Figure—2]

$$T = P_m(L i_d i_q + i_q \Phi_d - i_d \Phi_q) \quad (2)$$

As for inductance and magnet's magnetic flux both being electrical characteristics on an electric motor, position dependency components related to a rotational position of the electric motor are taken into consideration, and median values of electrical characteristics and position dependency components are separated to one another, so that the definitions are given as follows.

[Expression Figure—3]

$$L = L_0 + L_{ripple}$$

$$\Phi_d = \Phi_{d0} + \Phi_{dripple}$$

$$\Phi_q = \Phi_{q0} + \Phi_{qripple} \quad (3)$$

Figure 2:
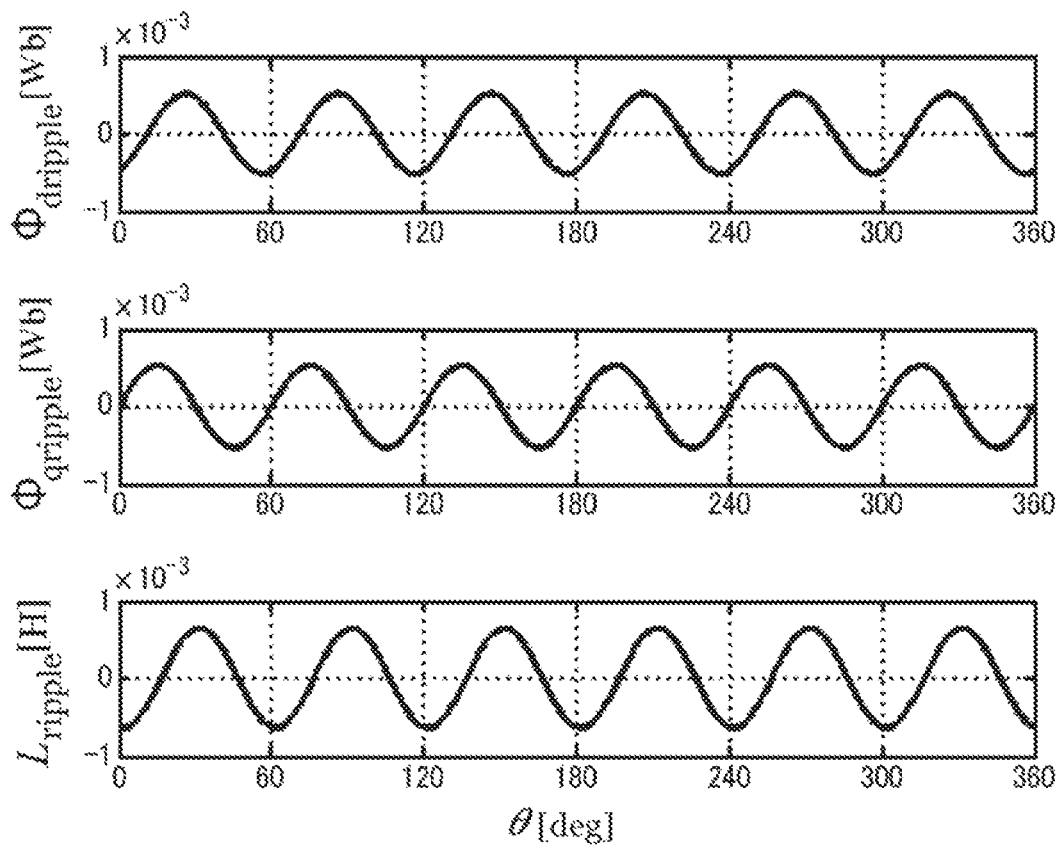
FIG. 2 is a diagram showing position dependency components in FIG. 1.

Here, designated are: L0, a median value of inductance; Lripple, a position dependency component of inductance; Φd0, a median value of d-axis magnet's magnetic flux; Φdripple, a position dependency component of d-axis magnet's magnetic flux; Φq0, a median value of q-axis magnet's magnetic flux; and Φqripple, a position dependency component of q-axis magnet's magnetic flux. Because a torque ripple caused due to the position dependency components can be calculated by using Expression (3) and by taking position dependency components into consideration, it becomes possible to perform the calculation of electric current correction instructions for suppressing the torque ripple. The position dependency components are defined as functions having values in accordance with a rotational position, as shown in FIG. 2. For example, position dependency components having a six-fold frequency of an electrical angular frequency can be expressed as described below.

[Expression Figure—4]

$$L_{ripple} = L_{6fs} \sin 6\theta + L_{6fc} \cos 6\theta$$

$$\Phi_{dripple} = \Phi_{d6fs} \sin 6\theta + \Phi_{d6fc} \cos 6\theta$$

$$\Phi_{qripple} = \Phi_{q6fs} \sin 6\theta + \Phi_{q6fc} \cos 6\theta \quad (4)$$

When the embodiment is applied by using Expression (4) described above, it becomes possible to achieve suppression of a torque ripple having a six-fold frequency of an electrical angular frequency. In addition, in place of the six-fold frequency of an electrical angular frequency, position dependency components having a number-n-fold frequency can be expressed as described below.

[Expression Figure—5]

$$L_{ripple} = L_{nfs} \sin n\theta + L_{nfc} \cos n\theta$$

$$\Phi_{dripple} = \Phi_{dnfs} \sin n\theta + \Phi_{dnfc} \cos n\theta$$

$$\Phi_{qripple} = \Phi_{qnfs} \sin n\theta + \Phi_{qnfc} \cos n\theta \quad (5)$$

As given by Expression (5) described above, a position dependency component of an arbitrary frequency can be aimed as a target. When the embodiment is applied by using Expression (5), it becomes possible to achieve suppression of a torque ripple having a number-n-fold frequency of an electrical angular frequency. In addition, when torque ripples of a plurality of frequencies are suppressed, electric current correction instructions of each of the frequencies are calculated by applying the embodiment and by using Expression (5) in each of the frequencies, it is suitable to perform superposition of those electric current correction instructions on fundamental electric current instructions.

Subsequently, by separating median values of electrical characteristics and position dependency components to one another, which are then substituted into the torque equation, Expression (2) described above can be developed into Expression (6).

[Expression Figure—6]

$$T = P_m((L_0 + L_{ripple})i_d i_q + i_q(\Phi_{d0} + \Phi_{dripple}) - i_d(\Phi_{q0} + \Phi_{qripple})) \quad (6)$$

Moreover, when it is so arranged that correction instructions of a harmonic(s) are added to d-axis and q-axis currents, Expression (6) described above can be developed into Expression (7).

[Expression Figure—7]

$$T = P_m((L_0 + L_{ripple})(i_{d0} + i_{dripple})(i_{q0} + i_{qripple}) + (i_{q0} + i_{qripple})(\Phi_{d0} + \Phi_{dripple}) - (i_{d0} + i_{dripple})(\Phi_{q0} + \Phi_{qripple}) \quad (7)$$

Here, designated are: id0, a d-axis fundamental electric-current instruction's value; idripple, a d-axis current correction instruction's value; iq0, a q-axis fundamental electric-current instruction's value; and iqripple, a q-axis current correction instruction's value.

In Expression (7) described above, the attention is paid to a constant component of torque. The constant component of torque gives fundamental torque being an output of an electric motor. In an electric current control system, the electric current control is performed in such a manner that the fundamental torque being an output of the electric motor follows up a torque instruction value T*. By using electrical characteristics on an electric motor and fundamental electric current instructions id0 and iq0 therefor, fundamental torque T0 can be given by Expression (8) as described below.

[Expression Figure—8]

$$T_0 = P_m(L_0 i_{d0} i_{q0} + i_{q0}\Phi_{d0} - i_{d0}\Phi_{q0}) \quad (8)$$

As for a method of acquiring fundamental electric current instructions id0 and iq0 from fundamental torque, a maximum torque-per-ampere (MTPA) control may be suitably used, or another publicly known control method may also be suitably used. For example, when the MTPA control is used, the fundamental electric current instructions id0 and iq0 are calculated so that Expression (9) is satisfied as described below.

Figure 9:
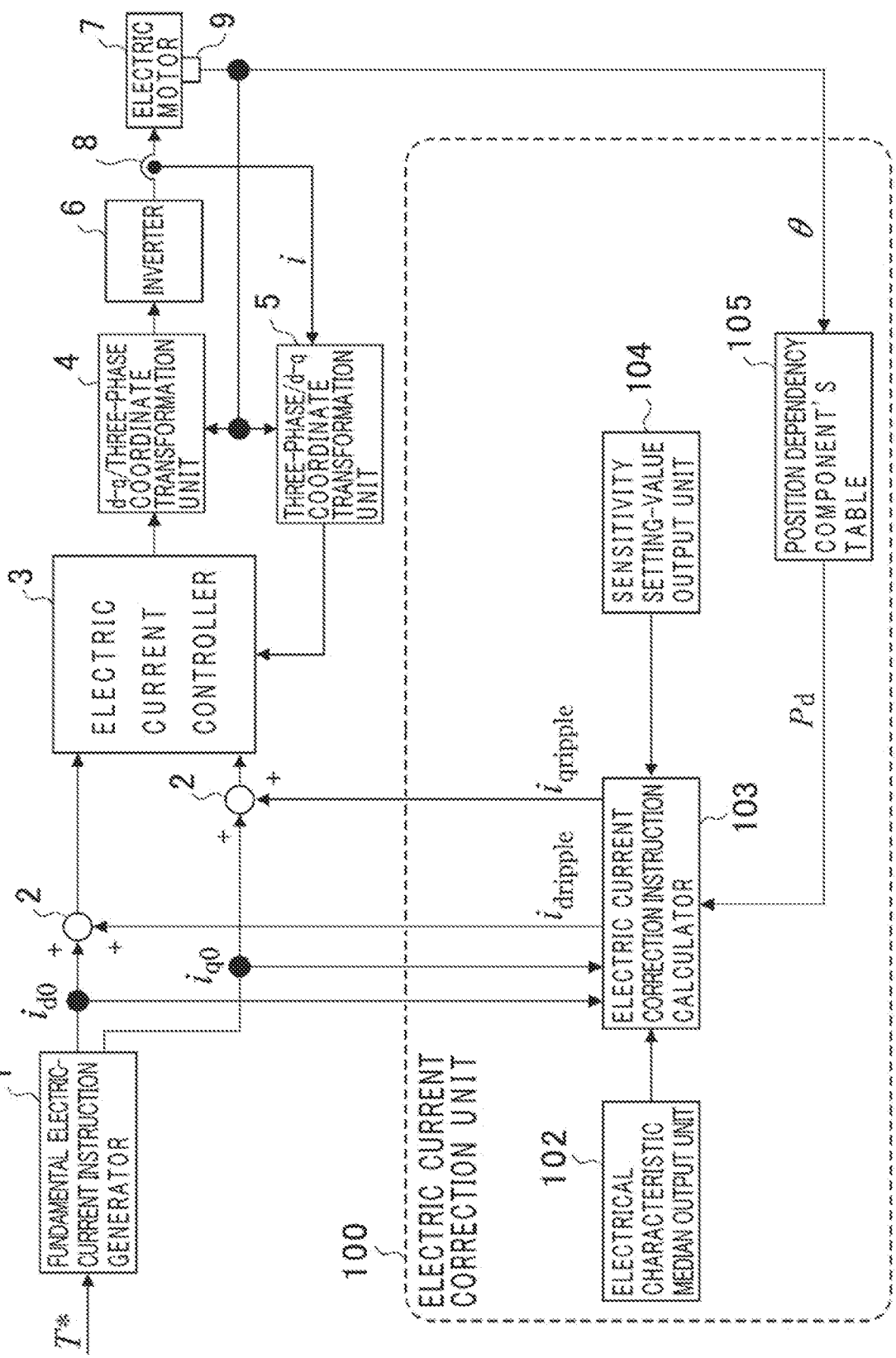
FIG. 9 is a block diagram illustrating a schematic configuration of an electric motor control device according to Embodiment 2.

[Expression FIG. 9]

$$i_{d0} = -\frac{\Phi_{d0}}{2L_0} - \sqrt{\frac{\Phi_{d0}^2}{4L_0^2} + i_{q0}^2} \quad (9)$$

From Expression (8) and Expression (9), fundamental electric current instructions id0 and iq0 are calculated. Even when another publicly known control method is used, the fundamental electric current instructions are calculated based on Expression (8) giving the fundamental torque.

Next, in Expression (7), when it is presumed that a component of the second harmonic or more of harmonics is sufficiently small, a torque ripple being a harmonic component of torque can be given by Expression (10) as follows.

[Expression Figure—10]

$$T_{ripple} = P_m(L_{ripple} i_{d0} i_{q0} + L_0(i_{dripple} i_{q0} + i_{d0} i_{qripple}) + i_{q0}\Phi_{dripple} + i_{qripple}\Phi_{d0} - i_{d0}\Phi_{qripple} - i_{dripple}\Phi_{q0}) \quad (10)$$

Here, designated is: Tripple, a torque ripple.

In a case in which a median value of d-axis magnet's magnetic flux and that of inductance each have errors, Expression (10) described above can be given by Expression (11).

[Expression Figure—11]

$$T_{ripple} = P_m(L_{ripple} i_{d0} i_{q0} + (L_0 + \Delta L_0)(i_{dripple} i_{q0} + i_{d0} i_{qripple}) + i_{q0}\Phi_{dripple} + i_{qripple}(\Phi_{d0} + \Delta\Phi_{d0}) - i_{d0}\Phi_{qripple} - i_{dripple}\Phi_{q0}) \quad (11)$$

Here, designated are: ΔL0, an error of a median value of inductance; and ΔΦd0, an error of a median value of d-axis magnet's magnetic flux.

Figure 3:
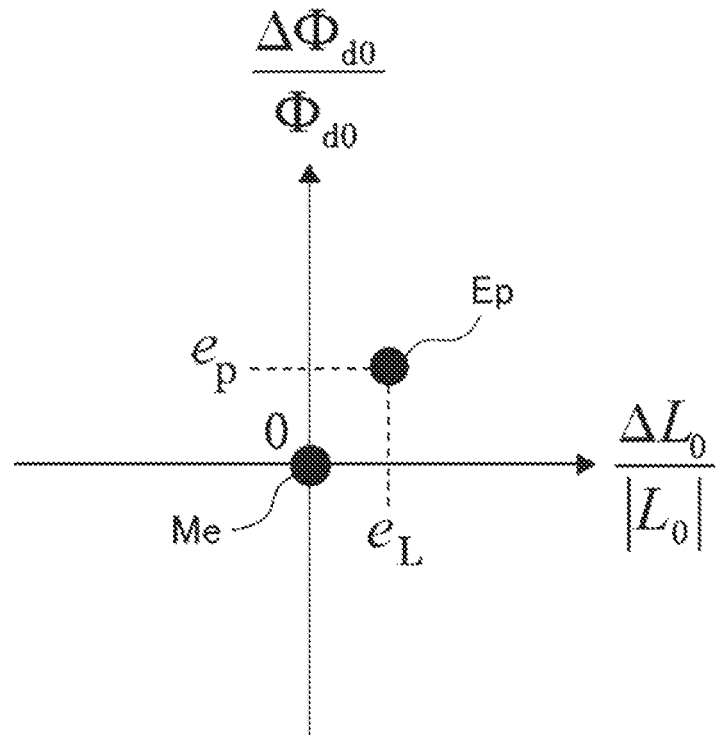
FIG. 3 is a diagram indicating an error range defined in embodiments.

Next, as for ΔL0 and ΔΦd0, a concept of an error region or range indicated in FIG. 3 is introduced, and the explanation will be made for electric current correction instruction's values for suppressing a torque ripple. As for the error range indicated in FIG. 3, the horizontal axis designates ΔL0/|L0| being a ratio of ΔL0 with respect to |L0|, and the vertical axis designates ΔΦd0/Φd0 being a ratio of ΔΦd0 with respect to Φd0. It is possible to represent arbitrary errors ΔL0 and ΔΦd0 as the coordinates of a point on the error range. For example, when both of ΔL0 and ΔΦd0 are at "0," the ΔL0 and ΔΦd0 correspond to the origin (0, 0) on the error range. In addition, when errors ΔL0 and ΔΦd0 each have the magnitudes of +10% with respect to median values Me, the ΔL0 and ΔΦd0 correspond to the coordinates (0.1, 0.1) on the error range. Hereinafter, a point on an error range is referred to as an error point Ep.

As for the design of electric current correction instructions, one error point Ep on the error range is selected, and the coordinates are defined as (eL, ep). Next, at the error point Ep being selected and at the origin, simultaneous equations are formulated so that a torque ripple given by Expression (11) becomes "0" as follows.

[Expression Figure—12]

$$0 = P_m(L_{ripple} i_{d0} i_{q0} + (L_0+0)(i_{dripple} i_{q0} + i_{d0} i_{qripple}) + i_{q0}\Phi_{dripple} + i_{qripple}(\Phi_{d0}+0) - i_{d0}\Phi_{qripple} - i_{dripple}\Phi_{q0})$$

$$0 = P_m(L_{ripple} i_{d0} i_{q0} + (L_0+e_L|L_0|)(i_{dripple} i_{q0} + i_{d0} i_{qripple}) + i_{q0}\Phi_{dripple} + i_{qripple}(\Phi_{d0}+e_P\Phi_{d0}) - i_{d0}\Phi_{qripple} - i_{dripple}\Phi_{q0}) \quad (12)$$

Here, "L0" designates a median value Me of "Ld−Lq," so that it results in taking on "|L0|=−L0" in an electric motor having inverse saliency. When electric current correction instructions idripple and iqripple are solved to satisfy the simultaneous equations of Expression (12) described above, the following expression of electric current correction instructions can be obtained.

Figure 13:
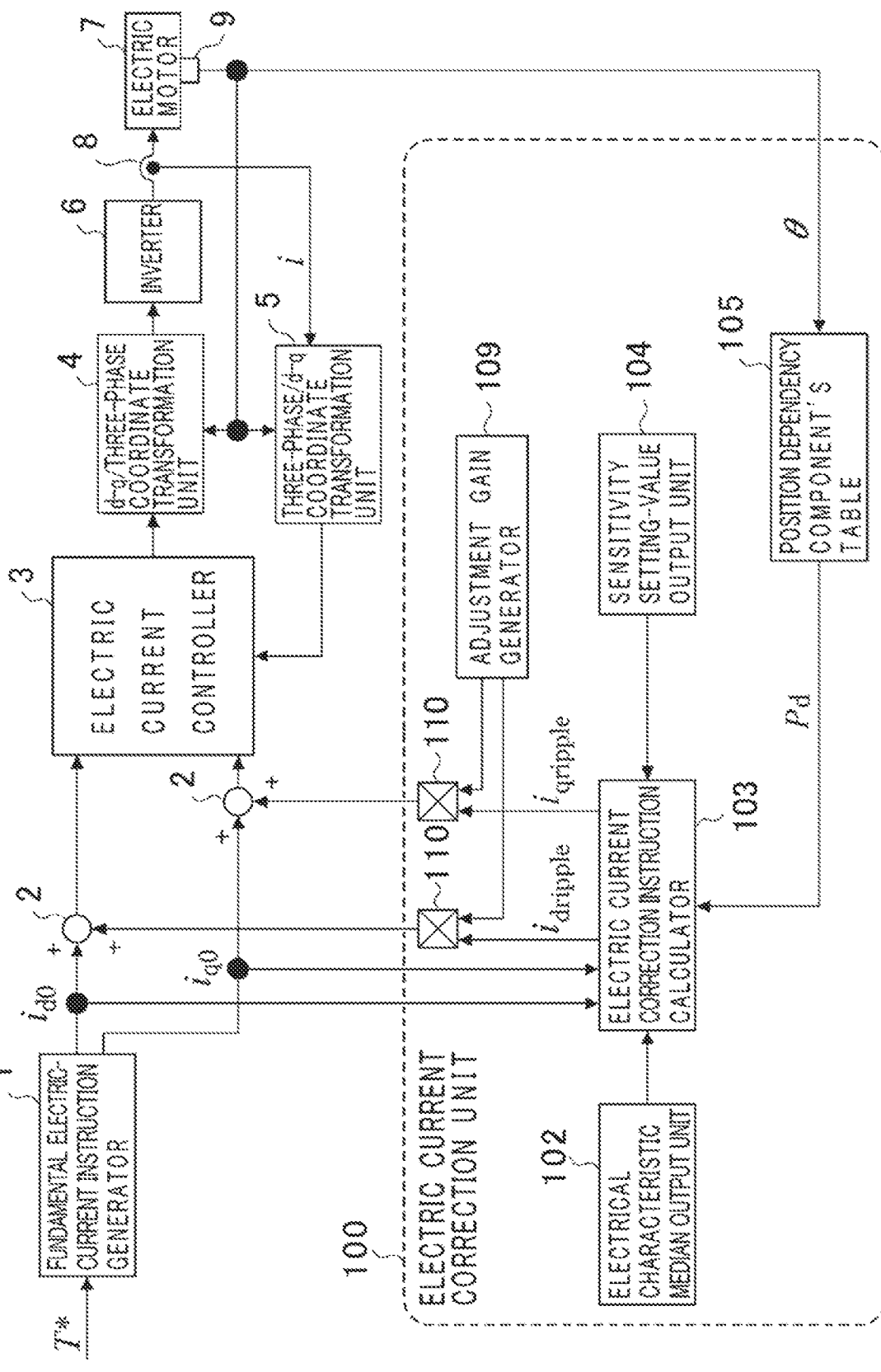
FIG. 13 is a block diagram illustrating a schematic configuration of a modification example of an electric motor control device according to Embodiment 4.

[Expression FIG. 13]

$$i_{qripple} = -\frac{L_{ripple} i_{d0} i_{q0} + i_{q0}\Phi_{dripple} - i_{d0}\Phi_{qripple}}{\left(1 + \frac{e_P}{e_L}\right)\Phi_{d0} - a\Phi_{q0}} \quad (13)$$

$$i_{dripple} = a i_{qripple}$$

$$a = \frac{-L_0 i_{d0} + \frac{e_P}{e_L}\Phi_{d0}}{L_0 i_{q0}}$$

In Expression (13) described above, a ratio at the coordinates (eL, ep) of an error point Ep is defined as follows.

Figure 14:
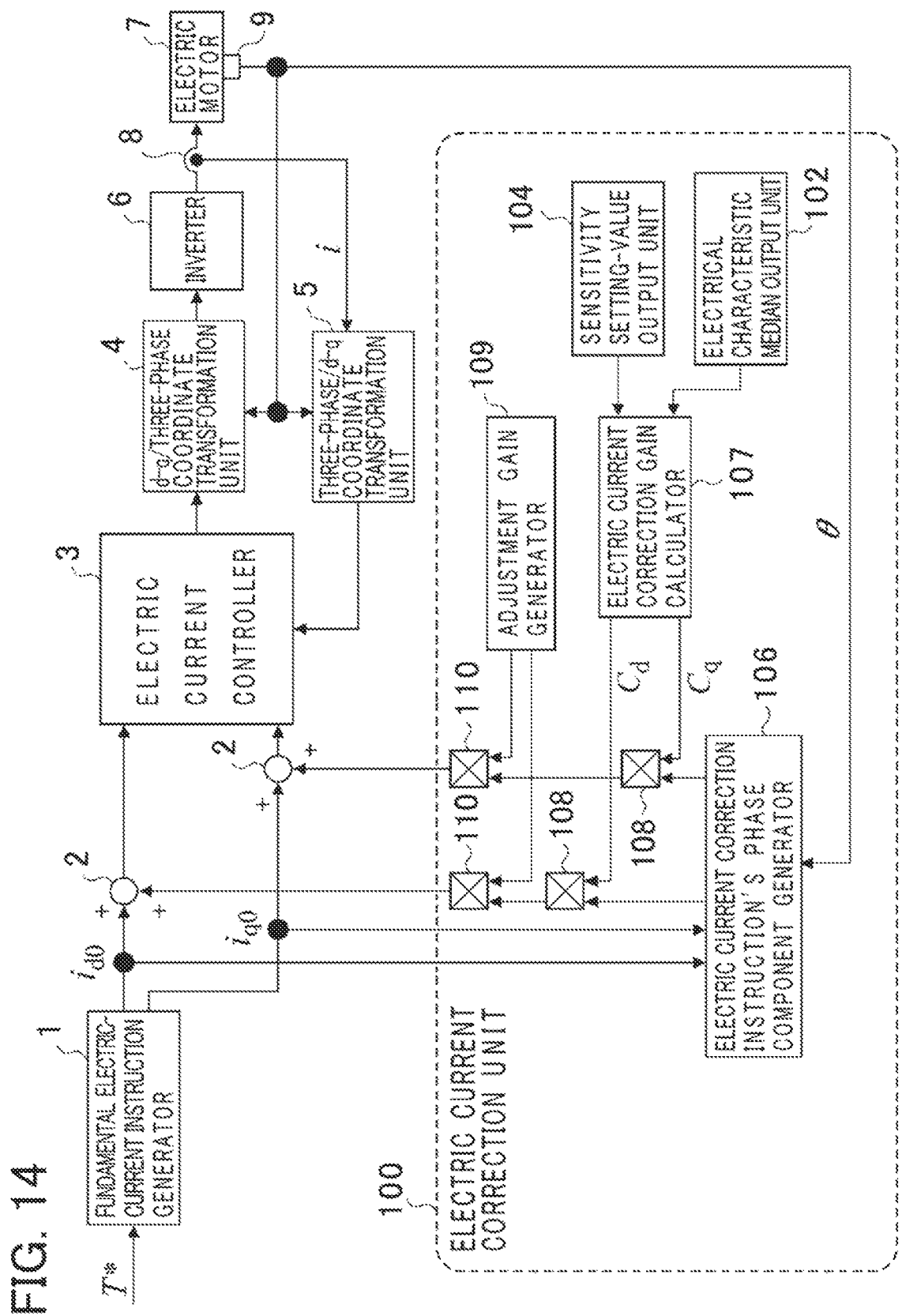
FIG. 14 is a block diagram illustrating a schematic configuration of another modification example of an electric motor control device according to Embodiment 4.

[Expression FIG. 14]

$$e = \frac{e_P}{e_L} \quad (14)$$

At this time, Expression (13) can be converted into Expression (15) as follows.

Figure 15:
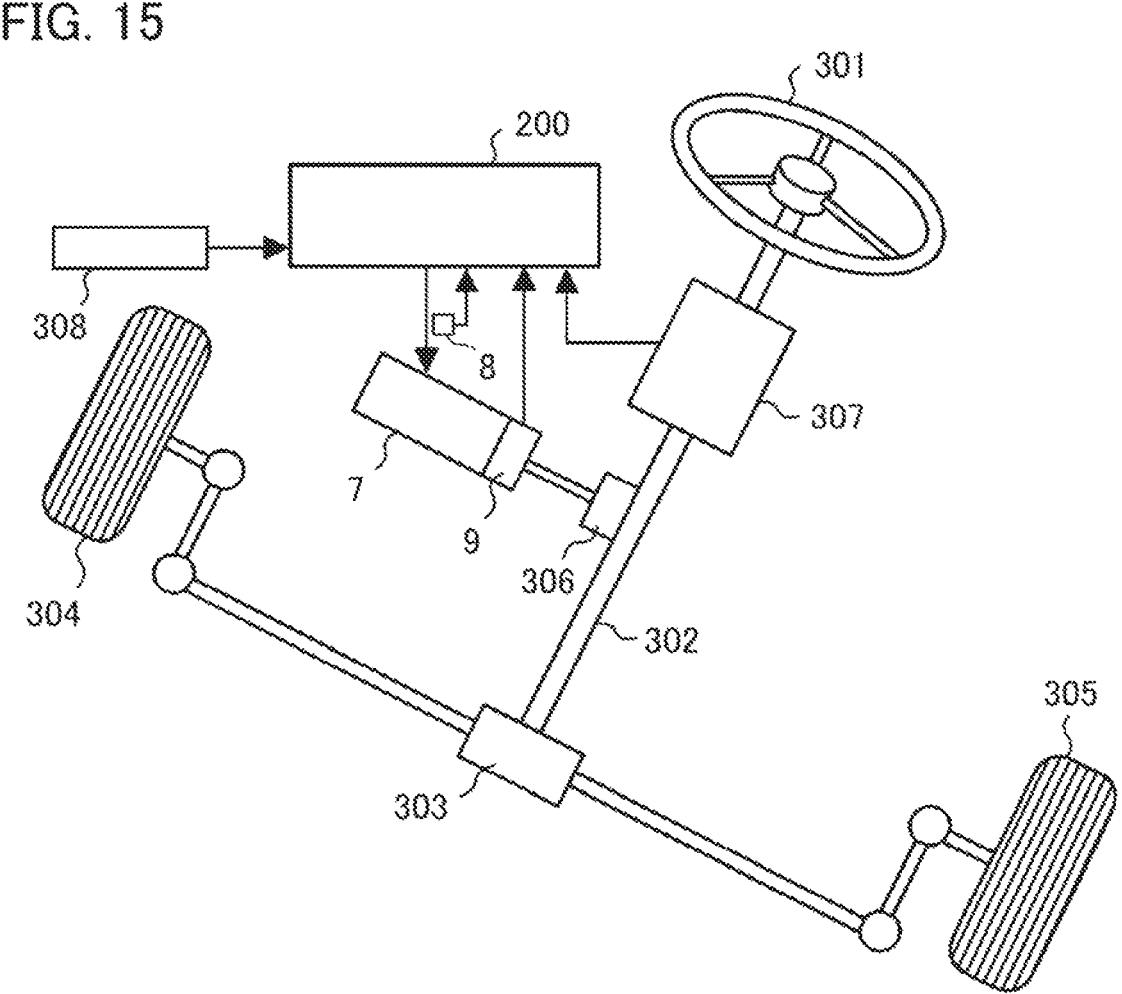
FIG. 15 is a diagram illustrating a configuration of an electric power steering apparatus in Embodiment 5 to which the electric motor control device according to the embodiments each is applied.

[Expression FIG. 15]

$$i_{qripple} = -\frac{L_{ripple} i_{d0} i_{q0} + i_{q0}\Phi_{dripple} - i_{d0}\Phi_{qripple}}{(1 + e)\Phi_{d0} - a\Phi_{q0}} \quad (15)$$

$$i_{dripple} = a i_{qripple}$$

$$a = \frac{-L_0 i_{d0} + e\Phi_{d0}}{L_0 i_{q0}}$$

Figure 5:
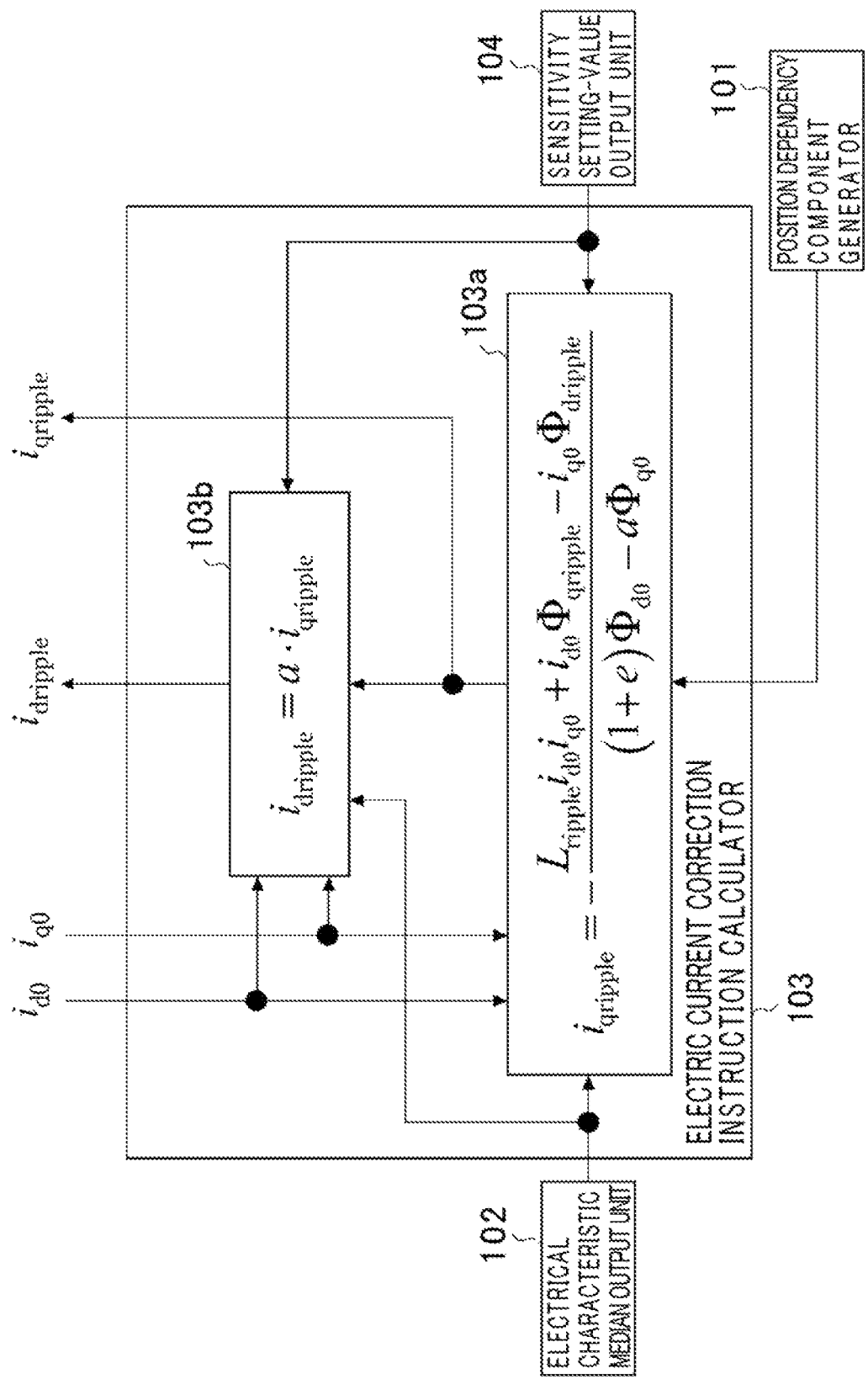
FIG. 5 is a diagram showing the interior of an electric current correction instruction calculator in embodiments.

Expression (15) indicates as shown in FIG. 5 that, after having acquired iqripple as in block 103a, it is possible to calculate idripple by using the iqrriple as in block 103b. For this reason, when iqripple can be calculated, idripple can be simply calculated. In addition, in Expression (15), it can be understood that electric current correction instructions do not depend on the coordinates of an error point itself, but depend on "e" being a ratio at the coordinates. That is to say, as far as an error point is at any point on a straight line to take on an inclination of "e," electric current correction instructions result in having exactly the same values at whatever the any point is selected as a specific error point. Moreover, electric current correction instructions given by Expression (15) are calculated so that a torque ripple takes on "0" at the specific error point, and therefore, it can be understood that the electric current correction instructions given by Expression (15) are for an electric current to achieve the torque ripple to become "0" at all of error points on the straight line where the inclination takes on "e." In this manner, therefore, depending on the setting of "e," it is possible to select the robust property or robustness with respect to an error of a median value of d-axis magnet's magnetic flux and to that of a median value of inductance.

Figure 4:
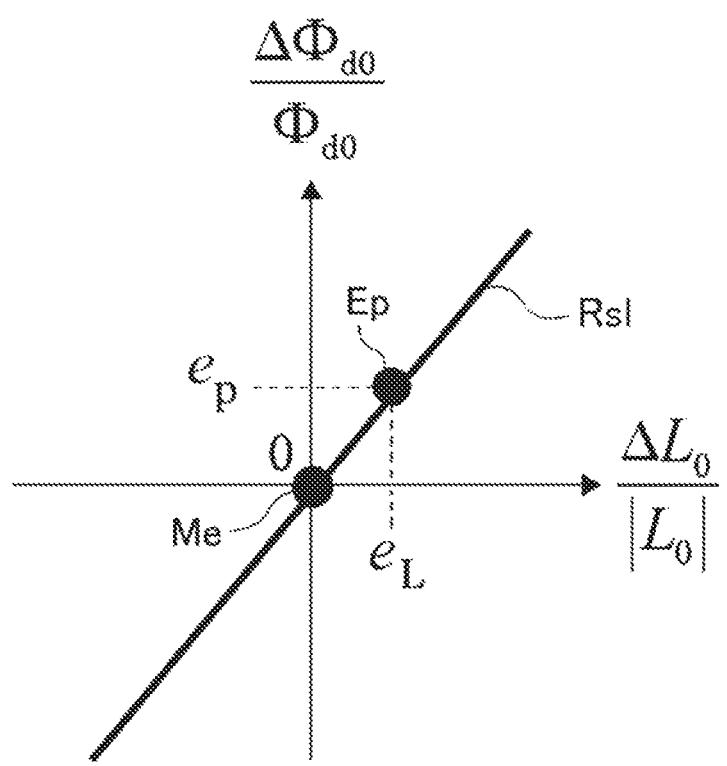
FIG. 4 is a diagram indicating a ripple suppression straight-line in the error range.

Hereinafter, a straight line taking on an inclination of "e" as indicated in FIG. 4 is referred to as a "ripple suppression straight-line." When "e" is approached closer and closer to "0," a ripple suppression straight-line Rsl is made coincident with the axis of ΔL0/L0. In accordance with the electric current correction instructions at this time, it becomes possible to achieve suppression of a torque ripple whenever ΔL0 has any error. That is to say, it is indicated that, by getting "e" being approached closer to "0," robustness is achieved with respect to ΔL0. According to similar considerations, when "e" is set at a large value, the ripple suppression straight-line Rsl is made coincident with the axis of ΔΦd0/Φd0, so that it is possible to suppress a ripple in a robust manner with respect to ΔΦd0. In addition, when "e" is set at an arbitrary value, it is possible to robustly suppress a ripple in a case in which the ratio between ΔL0 and ΔΦd takes on "e." Accordingly, there results in indicating that the sensitivity with respect to ΔL0 and ΔΦd0 is represented by "e," which is thus referred to as a sensitivity setting-value.

In addition, in Expression (15), starting the calculation first from a q-axis current correction instruction iqripple, a d-axis current correction instruction idripple is acquired from a value of iqripple, so that it is possible to calculate the idripple for the sake of simplification as the product of a simple integer times the value of iqripple. Moreover, firstly starting the calculation from idripple, iqripple may also be calculated by using the idripple. To be specific, Expression (16) can be given as described below.

Figure 16:
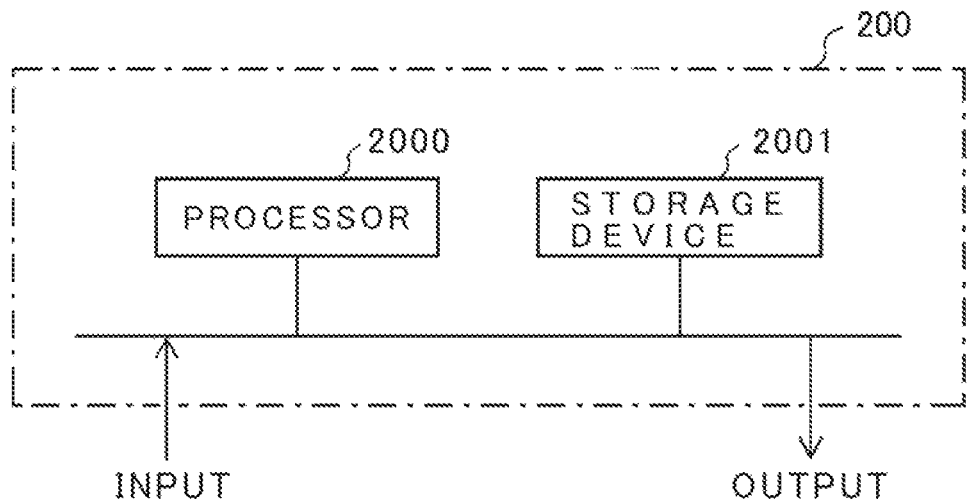
FIG. 16 is a diagram showing an example of a hardware configuration for the electric motor control device according to the embodiments each.

[Expression FIG. 16]

$$i_{dripple} = -\frac{L_{ripple}i_{d0}i_{q0} + i_{q0}\Phi_{dripple} - i_{d0}\Phi_{qripple}}{\frac{1}{a}(1+e)\Phi_{d0} - \Phi_{q0}} \quad (16)$$

$$i_{qripple} = \frac{1}{a}i_{dripple}$$

$$a = -\frac{L_0 i_{d0} + e\Phi_{d0}}{L_0 i_{q0}}$$

According to Expression (16) described above, when idripple can be calculated, iqripple can be simply calculated as the product of a constant times the idripple. Accordingly, a feature resides in that a d-axis current correction instruction of the embodiment and a q-axis current correction instruction thereof are equal in their phases to each other, or they have the difference of 180 degrees from each other. For this reason, when either one term of them is calculated, the other one term of them can be acquired by such a simple calculation of obtaining the product of a constant times the one term having been calculated.

The electric current correction instructions in the embodiment can also be applicable with respect to an electric motor having positive saliency whose feature resides in that d-axis inductance Ld of the electric motor is larger than q-axis inductance Lq thereof. In this case, when Expression (12) is solved by paying attention to the feature taking on "|L0|=L0" in Expression (12), the following expression can be obtained.

[Expression FIG. 17]

$$i_{qripple} = -\frac{L_{ripple}i_{d0}i_{q0} + i_{q0}\Phi_{dripple} - i_{d0}\Phi_{qripple}}{(1+e)\Phi_{d0} - a_2\Phi_{q0}} \quad (17)$$

$$i_{dripple} = a_2 i_{qripple}$$

$$a_2 = -\frac{L_0 i_{d0} + e\Phi_{d0}}{L_0 i_{q0}}$$

Expression (17) described above gives an electric current represented by a sensitivity setting-value of "e" similarly to the time when electric current correction instructions of an electric motor having inverse saliency are calculated. And so, when a value of "e" is approached closer and closer to "0," robustness is achieved with respect to ΔL0; and meanwhile, when the value of "e" is set at a large value, the robustness is achieved with respect to ΔΦd0. In Expression (17), starting the calculation first from a q-axis current correction instruction iqripple, a d-axis current correction instruction idripple is acquired from a value of iqripple; however, firstly starting the calculation from idripple, the value of iqripple may also be calculated by using the idripple. To be specific, Expression (18) can be given as described below.

[Expression FIG. 18]

$$i_{dripple} = -\frac{L_{ripple}i_{d0}i_{q0} + i_{q0}\Phi_{dripple} - i_{d0}\Phi_{qripple}}{\frac{1}{a_2}(1+e)\Phi_{d0} - \Phi_{q0}} \quad (18)$$

$$i_{qripple} = \frac{1}{a_2}i_{dripple}$$

$$a_2 = -\frac{L_0 i_{d0} + e\Phi_{d0}}{L_0 i_{q0}}$$

Next, the explanation will be made for the relationship between the sensitivity of torque ripple and the magnitudes of electric current correction instructions. As for the torque ripple given by Expression (12), when inclinations with respect to ΔL0 and to ΔΦd0 are calculated, the following expression can be derived, respectively.

[Expression FIG. 19]

$$\frac{\partial T_{ripple}}{\partial \Delta L_0} = P_m(i_{dripple}i_{q0} + i_{d0}i_{qripple}) \quad (19)$$

$$\frac{\partial T_{ripple}}{\partial \Delta \Phi_{d0}} = P_m(i_{qripple})$$

According to Expression (19) described above, it is suitable that "idripple*iq0+iqripple*id0" is reduced in order to lower the sensitivity of torque ripple with respect to ΔL0. In addition, in order to lower the sensitivity of torque ripple with respect to ΔΦd0, it is suitable that "iqripple" is reduced. Here, as for the inclination of torque ripple with respect to ΔL0, iq0 is basically larger than id0 excluding the time of fast rotation when the id0 taking on a larger weakeningcurrent is required, and thus, it is suitable that idripple is reduced in order to lower the sensitivity of torque ripple with respect to the ΔL0. As described above, the relationship between the sensitivity of torque ripple and the magnitudes of electric current correction instructions is attained.

Figure 6A:
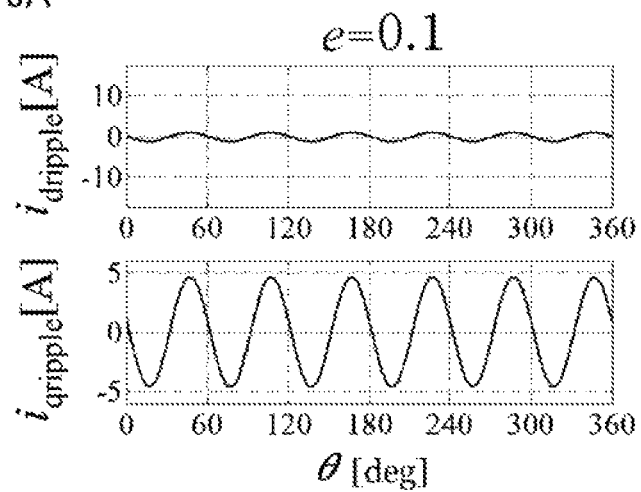
FIGS. 6A, 6B and 6C are diagrams each showing electric current correction instructions in embodiments.
Figure 6B:
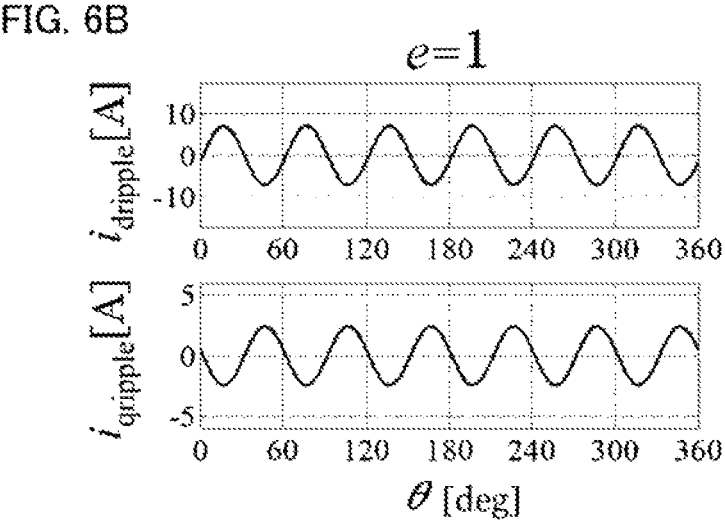
Figure 6C:
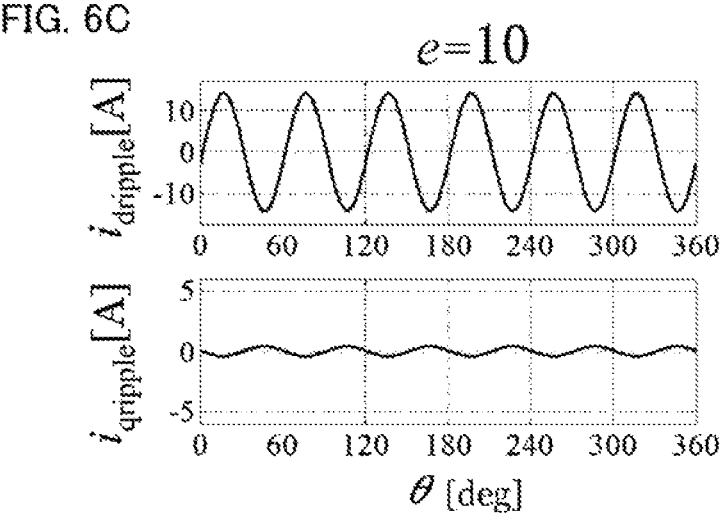

FIGS. 6A, 6B and 6C are diagrams in which a value of "e" being a sensitivity setting-value is set in three ways or values of (0.1, 1 and 10), and respective electric current correction instructions are shown at those values. FIG. 6A shows a case in which "e" being a sensitivity setting-value is "0.1"; FIG. 6B, a case in which "e" being the sensitivity setting-value is "1"; and FIG. 6C, a case in which "e" being the sensitivity setting-value is "10." When consideration is given to FIGS. 6A, 6B and 6C, it can be verified that, in a case in which a sensitivity setting-value of "e" is small where robustness is achieved with respect to ΔL0 on a design basis, a d-axis current correction instruction idripple is made smaller. In addition, it can be verified that, in a case in which the sensitivity setting-value of "e" is large where robustness is achieved with respect to ΔΦd0 on a design basis, a q-axis current correction instruction iqripple is made smaller. From the relationship described above, it can be understood that "e" being the sensitivity setting-value is a parameter for adjusting the magnitudes of d-axis and q-axis current correction instructions idripple and iqripple. That is to say, when "e" being a sensitivity setting-value is made smaller, a d-axis current correction instruction idripple becomes smaller, whereas, when the "e" being the sensitivity setting-value is made larger, a q-axis current correction instruction iqripple becomes smaller. Accordingly, the sensitivity setting-value of "e" manipulates a ratio between the magnitude of a d-axis current correction instruction and that of a q-axis current correction instruction, and is a parameter for determining the robust property or robustness with respect to ΔL0 and to ΔΦd0, so that, by energizing the electric current correction instructions of the embodiment to flow through, it is possible to achieve a torque ripple getting smaller than a conventional one, in a case in which there exist errors in electrical characteristics on an electric motor.

Figure 7A:
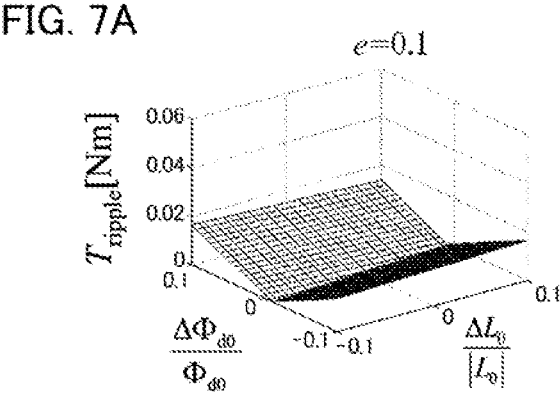
FIGS. 7A, 7B, 7C and 7D are each comparative diagrams of torque ripples in the embodiments and that in Patent Document 1.
Figure 7B:
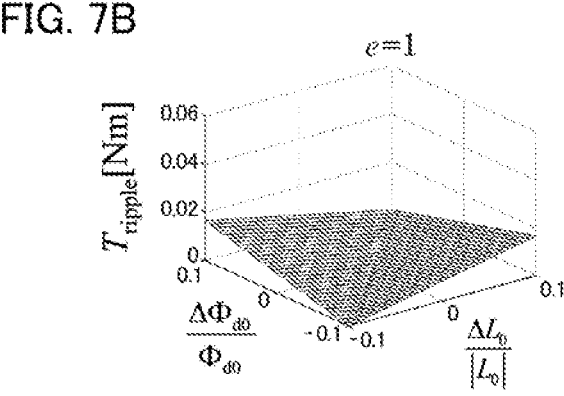
Figure 7C:
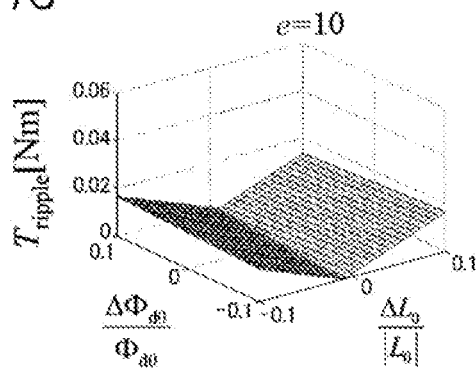
Figure 7D:
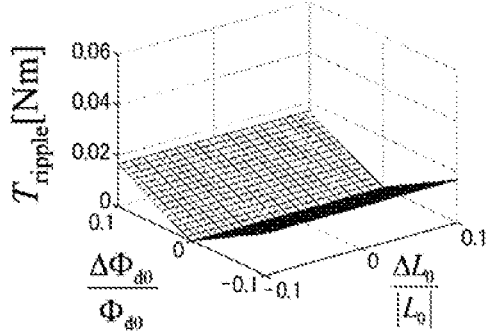
Figure 8A:
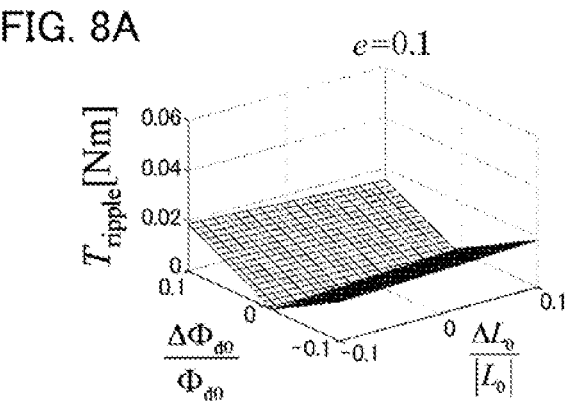
FIGS. 8A, 8B, 8C and 8D are each comparative diagrams of torque ripples in the embodiments and that in Patent Document 1.
Figure 8B:
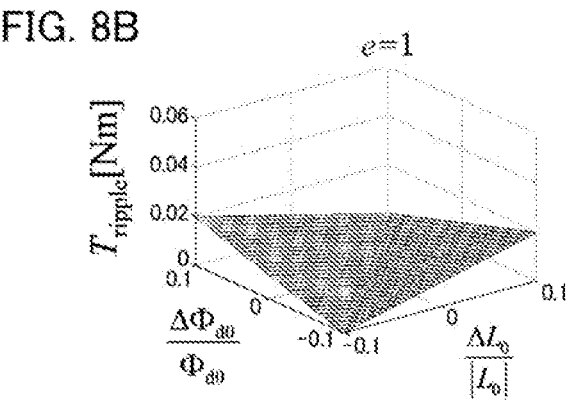
Figure 8C:
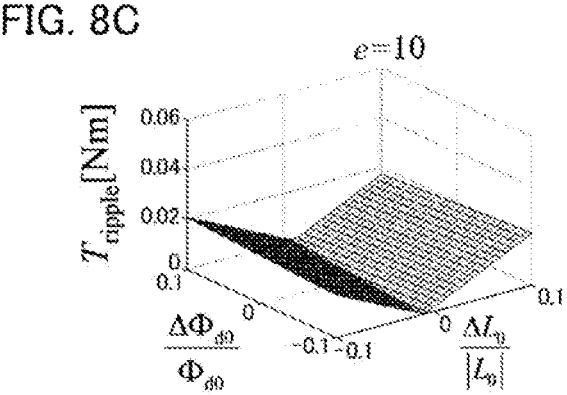
Figure 8D:
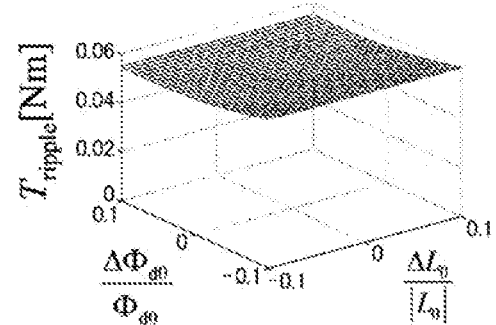

As for the robustness with respect to errors of electrical characteristics on an electric motor and for torque-ripple suppression performance, the magnitudes of torque ripples caused at the times when the electric current correction instructions of the embodiment and an electric current correction instruction of Patent Document 1 are energized individually to flow through are shown in FIGS. 7A, 7B, 7C and 7D, and in FIGS. 8A, 8B, 8C and 8D. FIG. 7A and FIG. 8A show cases each in which e=0.1; FIG. 7B and FIG. 8B, cases each in which e=1; FIG. 7C and FIG. 8C, cases each in which e=10; and FIG. 7D and FIG. 8D, cases each of Patent Document 1. FIGS. 7A, 7B, 7C and 7D, and FIGS. 8A, 8B, 8C and 8D are figures in each of which the bottom plane indicates an error range, and the vertical axis indicates a torque ripple, whereby plotted are the magnitudes of torque ripples caused when electrical characteristics on an electric motor have errors in the error range. FIGS. 7A, 7B, 7C and 7D show the cases where there do not exist pulsation in q-axis magnet's magnetic flux and that in inductance, but there exists pulsation in d-axis magnet's magnetic flux. An electric current correction instruction of Patent Document 1 in FIG. 7D indicates resembling tendency to the case of electric current correction instructions of the embodiment in FIG. 7A where e=0.1; and so, even when there exists an error of inductance, ΔL0, a feature can be brought about, whereby a torque-ripple suppression effect is difficult to become slim. However, in a case in which there exists an error of d-axis magnet's magnetic flux, ΔΦd0, the torque-ripple suppression effect becomes slim. This shows that, in regard to an electric motor whose ΔΦd0 is easily caused due to a reason of a manufacturing method, or to that of the measurement of electrical characteristics on the electric motor, it is not possible to suppress a torque ripple by means of an electric current correction instruction of Patent Document 1. In this regard, by only modifying "e" being a sensitivity setting-value according to the electric current correction instructions of the embodiment, it becomes possible to achieve suppression of torque ripple even in a case in which ΔΦd0 is easily caused. FIG. 7B indicates that it is possible to suppress a torque ripple in a case in which ΔL0 and ΔΦd0 have tendency to take on the ratio in a comparable degree with respect to each of their median values; and FIG. 7C indicates that it is possible to suppress a torque ripple in a case in which ΔΦd0 is easily caused.

In addition, in any one case of the electric current correction instructions in FIGS. 7A, 7B, 7C and 7D, a maximum value of a torque ripple is at 0.0167 N·m in the error ranges each; because, in a case in which torque ripple suppression is not performed, the magnitude of a torque ripple is at 0.167 N·m, it is made possible to perform the reduction of 90% even in the worst case. Moreover, when ΔL0 and ΔΦd0 have arbitrary errors in their error ranges, it can be found from FIGS. 7A, 7B, 7C and 7D that, in a case in which electric current correction instructions are energized to flow through at e=1, a region having high torque-ripple suppression effects is larger than those in other cases. For the sake of comparison, in each of electric current correction instructions, a region of errors is acquired in which 0.0084 N·m being half of the maximum value of a torque ripple or less is achieved, and the region is calculated as a ratio with respect to an overall area of an error range. When the calculations are carried out, a region in which the 0.0084 N·m or less is achieved according to Patent Document 1 is at 48% of the error range; meanwhile, according to the electric current correction instructions of the embodiment, the region results in at 53% in a case in which e=0.1; the region, at 74% in a case in which e=1; and the region, at 53% in a case in which e=10. For this reason, it can be understood that, with "e=1," the probability of suppressing a torque ripple is in the highest, at a time when ΔL0 and ΔΦd0 have arbitrary errors with uniform probability in their error ranges. As described above, the electric current correction instructions of the embodiment can further reduce a torque ripple than a conventional one, in a case in which there exist errors of electrical characteristics on an electric motor.

Next, FIGS. 8A, 8B, 8C and 8D show cases in each of which, in addition to pulsation in d-axis magnet's magnetic flux, there also exist pulsation in q-axis magnet's magnetic flux and that in inductance. At this time, the magnitude of a torque ripple when torque ripple suppression is not performed is at 0.1881 N·m. According to FIG. 8D, the magnitude of a torque ripple when using an electric current correction instruction of Patent Document 1 is at about 0.06 N·m in a case of any error, so that an effect of torque ripple suppression being a primary object results in at 68%. Although the reduction of torque ripple can be performed in comparison with a case in which torque ripple suppression is not performed, effects of torque ripple suppression become lower in comparison with the reduction ratio when there exists no pulsation in q-axis magnet's magnetic flux, nor pulsation in inductance. On the other hand, according to the electric current correction instructions of the embodiment, torque-ripple suppression effects are high even when there exist pulsation in the q-axis magnet's magnetic flux and that in the inductance, and in addition, the robust property or robustness with respect to a value of "e" being a sensitivity setting-value and to each of errors also appears exactly according to the characteristics of design being made. As described above, in a case in which there also exist pulsation in the q-axis magnet's magnetic flux and that in the inductance, the electric current correction instructions of the embodiment can suitably achieve suppression of torque ripple even in a case in which there exist errors of electrical characteristics on an electric motor.

In the explanation referring to FIGS. 7A, 7B, 7C and 7D, and to FIGS. 8A, 8B, 8C and 8D described above, a region in which an error of a median value of inductance of an electric motor and that of a median value of armature interlinkage magnetic-flux thereof each can actually take on is defined at a multiple of 0.1; namely, the explanation referring to those figures has been made in which a value capable of being actually taken on as a "ratio" between errors of the median values is defined as "1," so that "e=1" results in the best. Also when a "ratio" between an error of a median value of inductance of an electric motor and that of a median value of armature interlinkage magnetic-flux thereof each, being capable of actually taking on a value, is at another value other than "1," it is possible to maximize an error range in which an amplitude of a torque ripple is small by grasping the value in advance and by giving the value to a sensitivity setting-value of "e." Namely, according to thus the configuration of the embodiment, electric current correction instructions can be generated in accordance with an error range in which median values of electrical parameters can take on, and so, it is possible to best heighten in the error range the probability of achieving a torque ripple made smaller than its predetermined value, at a time when $\Delta L0$ and $\Delta \Phi d0$ have arbitrary errors with uniform probability in their error ranges.

Embodiment 2

Next, the explanation will be made referring to FIG. 9 for an electric motor control device according to Embodiment 2. Embodiment 2 is a case in which a position dependency component's table 105 on an electric motor with respect to its rotational position is included as exactly illustrated in FIG. 9; and so, based on the table, a position dependency component Pd is outputted, and electric current correction instructions are calculated.

Figure 10:
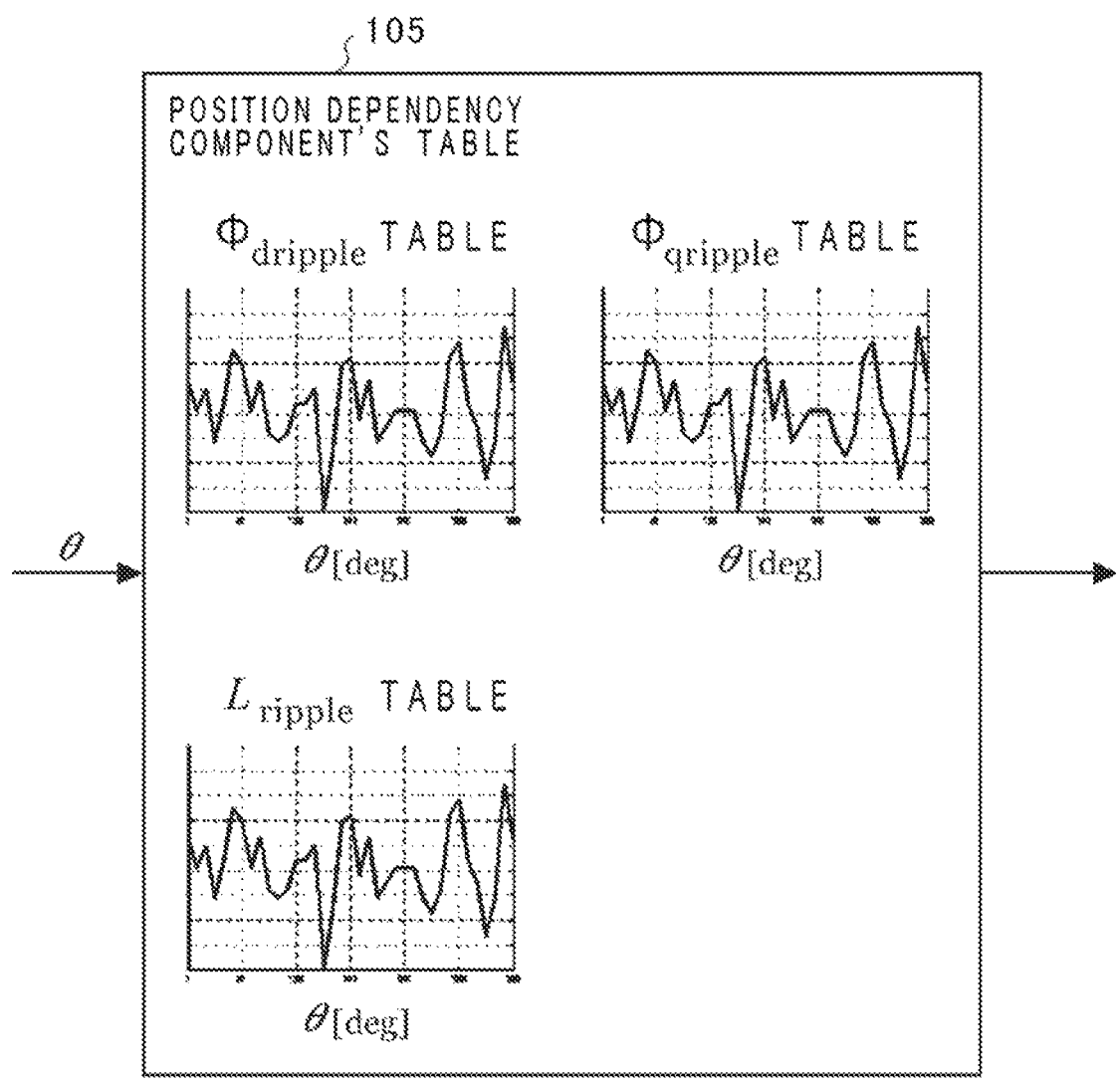
FIG. 10 is a diagram showing a position dependency component's table in embodiments.

In the embodiment, the inductance of an electric motor and magnet's magnetic flux thereof are measured in advance by means of a publicly known method, and, by subtracting their mean values from each of measurement values, position dependency components are extracted. Position dependency components having been extracted are made as table data with respect to a rotational position as shown in FIG. 10, so that a position dependency component Pd in accordance with the rotational position is outputted into the electric current correction instruction calculator 103. By performing the calculations in the electric current correction instruction calculator 103 for outputting d-axis and q-axis current correction instructions similarly to those of Embodiment 1, electric current correction instructions are calculated which robustly suppress a torque ripple with respect to an electrical characteristic(s) on the electric motor, and, by performing superposition of the electric current correction instructions on d-axis and q-axis fundamental electric-current instructions, it becomes possible to achieve suppression of the torque ripple. As for the table data in the embodiment, table data including not only a 6-f component, but also an arbitrary frequency component may also be made. From table data including an arbitrary frequency component, by outputting a position dependency component into the electric current correction instruction calculator 103, electric current correction instructions are calculated, and, by performing superposition of them on the d-axis and q-axis fundamental electric-current instructions based on Expression (15), it becomes possible to achieve suppression of a torque ripple of the same frequency to a frequency component included in the table data. In a case in which a plurality of frequency components is included in the table data, it is possible to suppress torque ripples having the same frequencies as those frequency components; and thus, it is not necessary to calculate electric current correction instructions individually for each of the frequencies, so that it becomes possible to reduce the amount of calculations.

A sensitivity setting-value of "e" has already been explained as in Embodiment 1; and so, when a value of "e" is made smaller, idripple becomes smaller, so that an electric current for suppressing a torque ripple is achieved in a robust manner with respect to an error of a median value of inductance, $\Delta L0$; and meanwhile, when the value of "e" is made larger, iqripple becomes smaller, so that it is possible to robustly suppress a torque ripple with respect to an error of a median value of d-axis magnet's magnetic flux, $\Delta \Phi d0$. Accordingly, also in the embodiment, it is possible to alter a ratio between the magnitudes of d-axis and q-axis current correction instructions by means of the sensitivity setting-value of "e," whereby it becomes possible to achieve suppression of a torque ripple by means of the sensitivity setting-value even in a case in which there exist errors in electrical characteristics on an electric motor.

Embodiment 3

Figure 11:
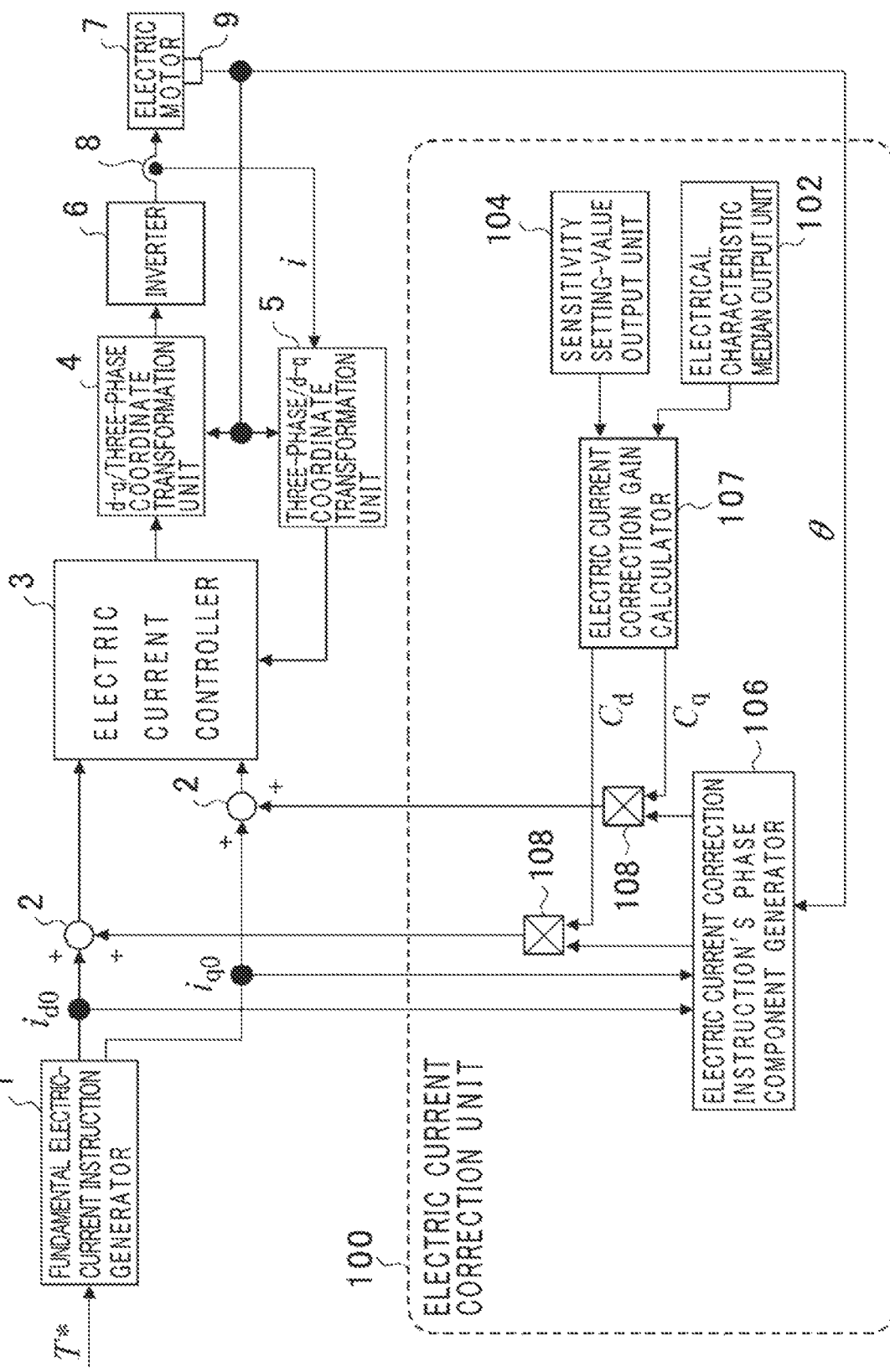
FIG. 11 is a block diagram illustrating a schematic configuration of an electric motor control device according to Embodiment 3.

Next, the explanation will be made referring to FIG. 11 for an electric motor control device according to Embodiment 3. As illustrated in FIG. 11, in Embodiment 3, included are an electric current correction instruction's phase component generator 106, an electric current correction gain calculator 107, and electric current correction gain multipliers 108.

In the embodiment, inductance of an electric motor and magnet's magnetic flux thereof are measured in advance by means of a publicly known method, and, by subtracting their mean values from each of measurement values, position dependency components are extracted. Subsequently, by following Expression (20) as described below where the numerator terms of Expression (15) are extracted, a three-dimensional table of phase component f(θ, id0, iq0) of d-axis and q-axis current correction instructions with respect to a rotational position of the electric motor, and to d-axis and q-axis fundamental electric-current instructions is made so as to function as the electric current correction instruction's phase component generator 106.

[Expression Figure—20]

$$f(\theta, i_{d0}, i_{q0}) = -(L_{ripple} i_{d0} i_{q0} + i_{q0} \Phi_{dripple} - i_{d0} \Phi_{qripple}) \quad (20)$$

By means of the electric current correction gain multipliers 108, electric current correction gains having been calculated by the electric current correction gain calculator 107 are multiplied by outputs corresponding to the phase component f(θ, id0, iq0) from the table having been made, and superposition is performed by the electric current correction instruction superposition units 2 on respective fundamental electric current instructions. In the embodiment, because the phase component of electric current correction instructions is possessed as the table, it is not required to separately make table data for each of electrical characteristics on an electric motor as in Embodiment 2, so that the amount of data can be reduced. In addition, as for the electric current correction instructions of the embodiment, a phase of a d-axis current correction instruction and that of a q-axis current correction instruction are equal in their phases to each other, or they have the difference of 180 degrees from each other, whereby, when a phase component expressed by Expression (20) is given, the d-axis current correction instruction and the q-axis current correction instruction can be acquired for the sake of simplification as the product of a simple integer times the phase component. The electric current correction gain calculator 107 calculates in accordance with Expression (21) as described below.

[Expression FIG. 21]

$$C_q = \frac{1}{(1+e)\Phi_{d0} - a\Phi_{q0}}$$

$$C_d = \frac{a}{(1+e)\Phi_{d0} - a\Phi_{q0}}$$

$$a = \frac{-L_0 i_{d0} + e\Phi_{d0}}{L_0 i_{q0}}$$

(21)

The role of the sensitivity setting-value of "e" in Expression (21) has already been explained as in Embodiment 1; and so, when a value of "e" is made smaller, idripple becomes smaller, so that an electric current for suppressing a torque ripple is achieved in a robust manner with respect to an error of a median value of inductance, $\Delta L0$; and meanwhile, when the value of "e" is made larger, iqripple becomes smaller, so that the electric current for suppressing a torque ripple is achieved in a robust manner with respect to an error of a median value of d-axis magnet's magnetic flux, $\Delta \Phi d0$.

Accordingly, also in the embodiment, it is possible to alter a ratio between the magnitudes of d-axis and q-axis current correction instructions by means of the sensitivity setting-value of "e," whereby it becomes possible to achieve suppression of a torque ripple by means of the sensitivity setting-value even in a case in which there exist errors in electrical characteristics on an electric motor.

Moreover, instead of having a table of the numerator terms of an electric current correction instruction, the numerator terms of the electric current correction instruction may also be calculated by applying them to a periodic function of trigonometric function. In that case, when position dependency components of an electric motor having a number-n-fold frequency of an electrical angular frequency as given by Expression (5) for example are taken as a target, a phase component of electric current correction instructions can be given by Expression (22) as described below.

[Expression Figure—22]

$$f(\theta, i_{d0}, i_{q0}) = -(L_{nfs} i_{d0} i_{q0} + i_{q0} \Phi_{dnfs} - i_{d0} \Phi_{qnfs}) \sin n\theta - L_{nfc} i_{d0} i_{q0} + i_{q0} \Phi_{dnfc} - i_{d0} \Phi_{qnfc}) \cos n\theta$$ (22)

By using Expression (22) described above, it becomes possible to achieve suppression of a torque ripple of a specific frequency, without carrying out making table data. For this reason, also in the embodiment, it is possible to distinguish the usage whether table data is used, or Expression (22) is used, according to the circumstantial cases.

Embodiment 4

Figure 12:
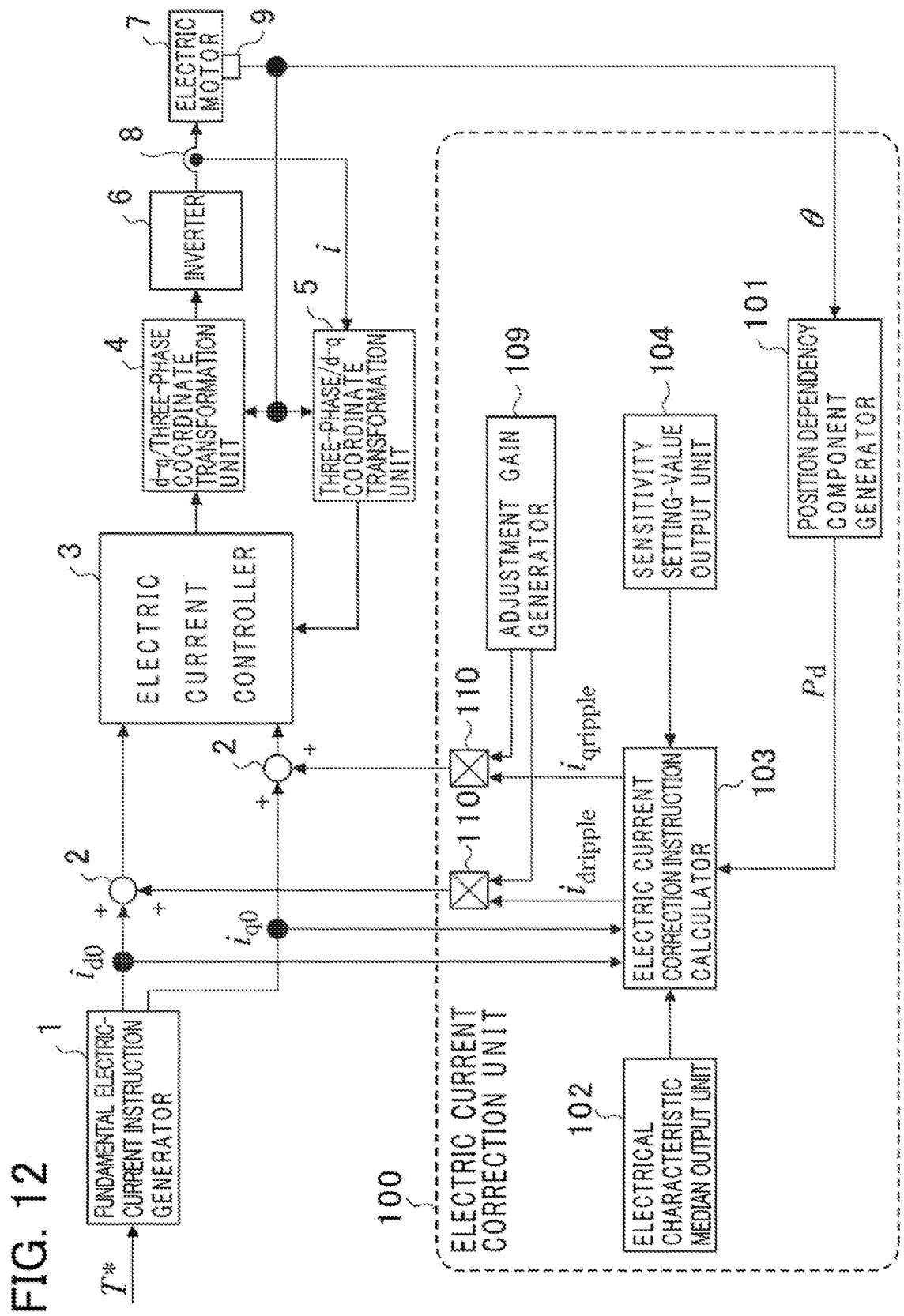
FIG. 12 is a block diagram illustrating a schematic configuration of an electric motor control device according to Embodiment 4.

Next, the explanation will be made referring to FIG. 12 through FIG. 14 for electric motor control devices according to Embodiment 4. In Embodiment 4, included are adjustment gain multipliers 110 each for multiplying electric current correction instructions by adjustment gains generated by an adjustment gain generator 109. The electric current correction instructions may also be suitable for a configuration as illustrated in FIG. 12 using Expression (15) explained in Embodiment 1, or they may also be suitable for a configuration such as a modification example illustrated in FIG. 13 using electric current correction instructions calculated from a phase component's table as explained in Embodiment 2, or they may also be suitable for a configuration such as another modification example illustrated in FIG. 14 using electric current correction instructions calculated from the electric current correction instruction's phase components and electric current correction gains as explained in Embodiment 3. It is so arranged that those adjustment gains take on a value from 0 to 1. Also in the embodiment, it is possible to alter a ratio between the magnitudes of d-axis and q-axis current correction instructions by means of a sensitivity setting-value of "e," whereby it becomes possible to achieve suppression of a torque ripple by means of the sensitivity setting-value even in a case in which there exist errors in electrical characteristics on an electric motor.

In addition, a phase of a d-axis current correction instruction and that of a q-axis current correction instruction are equal to each other, or are in the difference of 180 degrees from each other; and thus, it is suitable that a phase calculation of electric current correction instructions is performed on only either one term of d-axis current correction instruction and q-axis current correction instruction, so that the other one term can be acquired by only obtaining the product of a constant times the one term having been calculated. Because of this, the electric current correction instructions can be simply acquired.

Moreover, in the embodiment, it is adopted to have a configuration in which electric current correction instruction's values are made smaller than optimum design values of electric current correction instructions calculated by the electric current correction instruction calculator 103. According to this configuration, a torque-ripple suppression effect is reduced when electrical characteristics on the electric motor take on their median values; however, as explained in Embodiment 1, the smaller electric current correction instruction's values are, the higher robustness is achieved with respect to errors of the median values of electrical characteristics on the electric motor; and therefore, by applying the embodiment, a torque ripple can be reduced without causing degradation thereof even in a case in which variations of electrical characteristics on the electric motor are large. In accordance with variations of electrical characteristics on an electric motor, the embodiment can distinguish its usage with Embodiment 1.

Embodiment 5

In the aforementioned embodiments each, the explanation has been made for an electric motor control device(s), which may also be suitably applicable for an electric power steering apparatus comprising the electric motor control device, and an electric motor, having saliency, for producing assist torque in order to supplementally support steering of an operator or driver.

FIG. 15 is a diagram illustrating a configuration of an electric power steering apparatus in Embodiment 5. In FIG. 15, provided for the electric power steering apparatus are a steering wheel 301, a steering shaft 302, a rack-pinion gear 303, vehicle's wheels 304 and 305, the electric motor 7, a reduction gear 306, the rotational position detector 9, a torque sensor 307, a vehicle speed sensor 308, and an electric motor control device 200.

In FIG. 15, steering torque added to the steering wheel 301 from the driver not shown in the figure is transmitted, passing through a torsion bar of the torque sensor 307 and the steering shaft 302, to a rack by way of the rack-pinion gear 303, so that the vehicle's wheels 304 and 305 undergo turn directions.

The electric motor 7 is coupled to the steering shaft 302 by way of the reduction gear 306. Output torque produced from the electric motor 7 is transmitted to the steering shaft 302 by way of the reduction gear 306, so that steering torque being added by the driver at the time of his/her steering is mitigated.

The torque sensor 307 detects steering torque, being added to the torsion bar, which is produced by the driver who performs his/her steering on the steering wheel 301. Because a twist or torsion being approximately proportional to the steering torque is caused on the torsion bar due to the steering torque, the torsional angle is detected, and is converted into a steering torque signal. The vehicle speed sensor 308 outputs a vehicle speed being a signal in which a running speed of an automotive vehicle is detected.

Moreover, the electric motor control device 200 is an electric motor control device in any one of the embodiments described above; and so, in accordance with a steering torque signal detected by the torque sensor 307, a rotational position θ obtained by the rotational position detector 9 and a vehicle speed detected by the vehicle speed sensor 308, the electric motor control device determines the directions and magnitudes of electric current instructions corresponding to output torque where the electric motor 7 outputs, and controls, in order to produce the output torque on the electric motor 7, an electric current(s) to flow from an electric power-supply through the electric motor 7 based on the electric current instructions.

Also in such an electric power steering apparatus, by reducing the sensitivity of torque ripple with respect to errors of acquisition values of electrical characteristics on an electric motor similarly to Embodiment 1 through Embodiment 4, it becomes possible to achieve torque ripple suppression even in a case in which there exist errors in the electrical characteristics on the electric motor.

It should be noted that, as an example of hardware is illustrated in FIG. 16, the electric motor control device 200 is constituted of a processor 2000 and a storage device 2001. The storage device is provided with a volatile storage device of a random access memory (RAM) or the like, and with a nonvolatile auxiliary storage device of a flash memory or the like, which are not shown in the figure. In addition, in place of the flash memory, an auxiliary storage device of a hard disk may be provided with. The processor 2000 executes a program(s) inputted from the storage device 2001. In this case, the program(s) is inputted into the processor 2000 from the auxiliary storage device by way of the volatile storage device. Moreover, the processor 2000 may output its data of a calculated result(s) or the like into the volatile storage device of the storage device 2001, or may store the data into the auxiliary storage device by way of the volatile storage device.

In the present disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Numeral "1" designates a fundamental electric-current instruction generator; "2," electric current correction instruction superposition unit; "3," electric current controller; "6," inverter; "100," electric current correction unit; "101," position dependency component generator; "103," electric current correction instruction calculator; and "200," electric motor control device.

What is claimed is:

1. An electric motor control device for controlling an electric motor, having saliency, by an inverter of a vector control scheme, the electric motor control device, comprising:
    a fundamental electric-current instruction generator for outputting a d-axis fundamental electric-current instruction and a q-axis fundamental electric-current instruction for thereby outputting fundamental torque from the electric motor;
    a position dependency component generator for outputting a position dependency component of the electric motor in accordance with a rotational position of the electric motor;
    an electric current correction instruction calculator for calculating a d-axis current correction instruction and a q-axis current correction instruction from said d-axis fundamental electric-current instruction and said q-axis fundamental electric-current instruction, and from said position dependency component;
    an electric current correction instruction superposition device for generating a d-axis electric current instruction by performing superposition of said d-axis current correction instruction on said d-axis fundamental electric-current instruction, and for generating a q-axis electric current instruction by performing superposition of said q-axis current correction instruction on said q-axis fundamental electric-current instruction; and
    an electric current controller for controlling an electric current to flow through the electric motor by way of the inverter, based on the d-axis electric current instruction and the q-axis electric current instruction, wherein
    the electric current correction instruction calculator calculates a ratio being determined in advance to become a magnitude of said d-axis current correction instruction and that of said q-axis current correction instruction, and said ratio is preliminarily specified or specified in accordance with a state of the electric motor.

2. The electric motor control device as set forth in claim 1, wherein the position dependency component generator outputs a position dependency component of armature inter-linkage magnetic-flux of the electric motor, or that of inductance thereof, in accordance with a rotational position of the electric motor.

3. The electric motor control device as set forth in claim 1, wherein the electric current correction instruction calculator calculates said d-axis current correction instruction, based on armature interlinkage magnetic-flux of the electric motor and inductance thereof, on said d-axis fundamental electric-current instruction and said q-axis fundamental electric-current instruction, and on said q-axis current correction instruction.

4. The electric motor control device as set forth in claim 1, wherein said ratio is based on a sensitivity setting-value being a ratio between an error of a median value of armature interlinkage magnetic-flux of the electric motor and an error of a median value of inductance thereof.

5. The electric motor control device as set forth in claim 3, wherein said ratio is based on a sensitivity setting-value being a ratio between an error of a median value of armature interlinkage magnetic-flux of the electric motor and an error of a median value of inductance thereof.

6. The electric motor control device as set forth in claim 4, wherein the electric current correction instruction calculator calculates said d-axis current correction instruction and said q-axis current correction instruction, based on the sensitivity setting-value, on armature interlinkage magnetic-flux of the electric motor and inductance thereof, and on said d-axis fundamental electric-current instruction and said q-axis fundamental electric-current instruction.

7. The electric motor control device as set forth in claim 5, wherein the electric current correction instruction calculator calculates said d-axis current correction instruction and said q-axis current correction instruction, based on the sensitivity setting-value, on armature interlinkage magnetic-flux of the electric motor and inductance thereof, and on said d-axis fundamental electric-current instruction and said q-axis fundamental electric-current instruction.

8. The electric motor control device as set forth in claim 1, wherein a phase of said d-axis current correction instruction and that of said q-axis current correction instruction are equal to each other, or are in a difference of one hundred and eighty degrees from each other.

9. An electric power steering apparatus, comprising:
an electric motor, having saliency, for producing assist torque in order to supplementally support steering of a driver; and
an electric motor control device as set forth in claim 1.

10. An electric power steering apparatus, comprising:
an electric motor, having saliency, for producing assist torque in order to supplementally support steering of a driver; and
an electric motor control device as set forth in claim 2.

11. An electric power steering apparatus, comprising:
an electric motor, having saliency, for producing assist torque in order to supplementally support steering of a driver; and
an electric motor control device as set forth in claim 3.

12. An electric power steering apparatus, comprising:
an electric motor, having saliency, for producing assist torque in order to supplementally support steering of a driver; and
an electric motor control device as set forth in claim 4.

13. An electric power steering apparatus, comprising:
an electric motor, having saliency, for producing assist torque in order to supplementally support steering of a driver; and
an electric motor control device as set forth in claim 5.

14. An electric power steering apparatus, comprising:
an electric motor, having saliency, for producing assist torque in order to supplementally support steering of a driver; and
an electric motor control device as set forth in claim 6.

15. An electric power steering apparatus, comprising:
an electric motor, having saliency, for producing assist torque in order to supplementally support steering of a driver; and
an electric motor control device as set forth in claim 7.

16. An electric power steering apparatus, comprising:
an electric motor, having saliency, for producing assist torque in order to supplementally support steering of a driver; and
an electric motor control device as set forth in claim 8.

* * * * *